United States Patent
Panzarella et al.

(10) Patent No.: US 7,686,562 B2
(45) Date of Patent: Mar. 30, 2010

(54) LIFT AND CARRIER ASSEMBLY FOR A PERSONAL-TRANSPORTATION VEHICLE

(75) Inventors: Thomas A Panzarella, Harleysville, PA (US); David D McClanahan, Harleysville, PA (US); James B Eldon, III, Barto, PA (US)

(73) Assignee: Freedom Sciences, LLC, Green Lane, PA (US)

( * ) Notice: Subject to any disclaimer, the term of this patent is extended or adjusted under 35 U.S.C. 154(b) by 0 days.

(21) Appl. No.: 12/147,234

(22) Filed: Jun. 26, 2008

(65) Prior Publication Data

US 2008/0250984 A1     Oct. 16, 2008

Related U.S. Application Data

(63) Continuation of application No. 11/177,128, filed on Jul. 8, 2005, now abandoned.

(51) Int. Cl.
    *B60P 3/06*    (2006.01)
(52) U.S. Cl. .................................. 414/462; 414/921
(58) Field of Classification Search ................ 414/462, 414/921
    See application file for complete search history.

(56) References Cited

U.S. PATENT DOCUMENTS

| | | | | |
|---|---|---|---|---|
| 4,705,448 A | * | 11/1987 | Mungons | 414/462 |
| 4,741,660 A | * | 5/1988 | Kent | 414/462 |
| 4,916,265 A | * | 4/1990 | Luallen | 200/47 |
| 5,011,361 A | * | 4/1991 | Peterson | 414/462 |
| 5,366,338 A | * | 11/1994 | Mortensen | 414/563 |
| 5,567,107 A | * | 10/1996 | Bruno et al. | 414/462 |
| 5,816,763 A | * | 10/1998 | Hamann et al. | 414/462 |
| 6,692,215 B1 | * | 2/2004 | Panzarella et al. | 414/462 |
| 6,701,913 B1 | * | 3/2004 | LeDuc et al. | 126/276 |
| 6,729,827 B1 | * | 5/2004 | Williams et al. | 414/462 |
| 6,799,751 B1 | * | 10/2004 | Anderson | 254/223 |
| 6,887,027 B2 | * | 5/2005 | O'Leary et al. | 414/462 |
| 7,108,466 B2 | * | 9/2006 | Panzarella et al. | 410/7 |
| 7,278,815 B2 | * | 10/2007 | Pedrini | 414/462 |
| 7,396,202 B1 | * | 7/2008 | Panzarella et al. | 414/542 |
| 2003/0165376 A1 | * | 9/2003 | Bruno et al. | 414/462 |

OTHER PUBLICATIONS

Bruno Independent Living Aids, Bruno Out-Sider Micro, Bruno Model No. ASL-225, Flyer, Nov. 2003, Oconomowoc, WI.
Bruno Independent Living Aids, Bruno Out-Sider Micro, Bruno Model No. ASL-225, Flyer, Apr. 2005, Oconomowoc, WI.
Bruno Independent Living Aids, Bruno Out-Sider Micro, Bruno Model No. ASL-225, Installation Manual, pp. 1-30, Dec. 2003, Oconomowoc, WI.

(Continued)

*Primary Examiner*—James Keenan
(74) *Attorney, Agent, or Firm*—Fox Rothschild LLP

(57) ABSTRACT

A preferred embodiment of a lift and carrier assembly for a personal-transportation vehicle includes a first column, a second column telescopically disposed within the first column, a platform assembly pivotally coupled to the second column for supporting the personal-transportation vehicle, and a motor mounted on the first column and coupled to the second column so that the motor can lift the second column and the platform assembly, and a latch. The latch is movable between a first position, and a second position wherein the latch engages a pin mounted on the second column when the second column and the platform assembly are in a second position thereby securing the second column and the platform assembly in the second position.

12 Claims, 34 Drawing Sheets

OTHER PUBLICATIONS

Bruno Independent Living Aids, Bruno Out-Sider Micro, Bruno Model No. ASL-225, Installation Manual, pp. 1-31, Mar. 2004, Oconomowoc, WI.

Bruno Independent Living Aids, Bruno Out-Sider Micro, Bruno Model No. ASL-225, Installation Manual, pp. 1-38, Jan. 2005, Oconomowoc, WI.

* cited by examiner

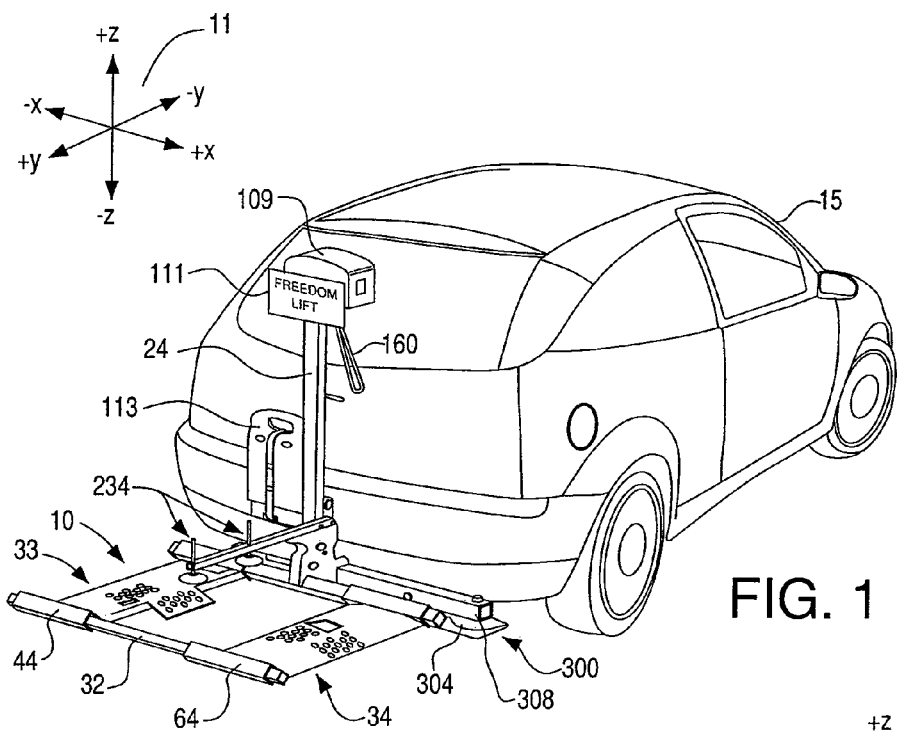
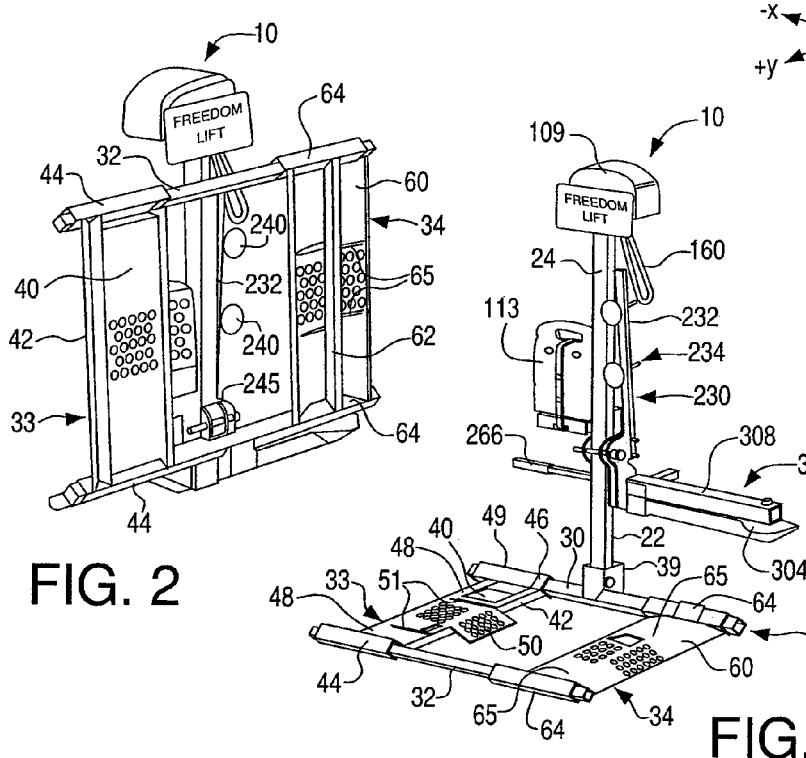
FIG. 1
FIG. 2
FIG. 3

LIFT AND CARRIER ASSEMBLY FOR A PERSONAL-TRANSPORTATION VEHICLE

CROSS-REFERENCE TO RELATED APPLICATIONS

This is a continuation of U.S. application Ser. No. 11/177,128, filed Jul. 8, 2005, the contents of which is incorporated by reference herein in its entirety.

FIELD OF THE INVENTION

The present invention relates to a lift and carrier assembly for personal transportation vehicles such as motorized scooters, wheelchairs, etc. The lift and carrier assembly can be mounted on a motorized vehicle such as an automobile, minivan, pickup truck, etc., to facilitate transport of the personal transportation vehicle.

BACKGROUND OF THE INVENTION

Personal-transportation vehicles such as motorized scooters are commonly used by individuals with ambulatory difficulties or other disabilities. Motorized scooters and like vehicles, in general, are too large to be transported inside of a motorized vehicle such as a passenger car. Furthermore, motorized scooters can weigh several hundred pounds or more. Thus, loading a motorized scooter onto and off of the motorized vehicle can present substantial difficulties.

Various types of carrier devices have been developed to facilitate the transportation of motorized scooters using passenger cars and other motorized vehicles. These devices typically are mounted on a trailer hitch or like connecting point on the motorized vehicle (hereinafter referred to as "the transporting vehicle"). The motorized scooter rides outside of the transporting vehicle, on a platform or like component of the carrier device. The carrier device typically includes provisions that permit the motorized scooter to be driven onto the platform at ground level, and then lifted to prevent contact with the road during transport. The carrier device may include a mechanism that automatically secures the motorized scooter in place on the platform during transport.

The use of relatively small, light weight motorized scooters, commonly referred to as "ultra-lites," is increasing. A need therefore exists for a lift and carrier assembly tailored for use with such ultra-lites. Optimally, a lift and carrier assembly adapted for this type of application has a relatively simple design and construction, can be supported by a class II or III trailer hitch, can be configured for use with different-sized scooters and wheelchairs, and can be operated by a user with limited strength or limited range of movement.

SUMMARY OF THE INVENTION

A preferred embodiment of a lift and carrier assembly for a personal-transportation vehicle comprises a first column, a second column telescopically disposed within the first column, and a platform assembly pivotally coupled to the second column for supporting the personal-transportation vehicle. The platform assembly and the second column can translate linearly in relation to the first column between a first and a second position.

The lift and carrier assembly also comprises a motor mounted on the first column and coupled to the second column for lifting and lowering the second column and the platform assembly between the first and second positions, and a latch. The latch is movable between a first position, and a second position wherein the latch engages a pin mounted on the second column when the second column and the platform assembly are in the second position thereby securing the second column and the platform assembly in the second position.

Another preferred embodiment of a lift and carrier assembly for a personal-transportation vehicle comprises an actuator column, a lifting column coupled to the actuator column so that the lifting column can translate linearly in relation to the actuator column, and a platform assembly pivotally coupled to the lifting column.

The platform assembly comprises a first and a second cross member, and a first platform weldment comprising a platform for supporting a front wheel of the personal-transportation vehicle, and a first and a second support fixed to the platform for securely engaging the respective first and second cross members. The platform assembly also comprises a second platform weldment comprising a platform for supporting a rear wheel of the personal-transportation vehicle, and a first and a second support fixed to the platform for securely engaging the respective first and second cross members. The first and second supports of the first and second platform weldments are selectively positionable along the respective first and second cross members so that the relative positions of the first and second weldments can be adjusted.

Another preferred embodiment of a lift and carrier assembly for a personal-transportation vehicle comprises a first column, a second column telescopically disposed within the first column, a platform assembly pivotally coupled to the second column for supporting the personal-transportation vehicle, and means coupled to the first column for securing the personal-transportation vehicle to the platform assembly.

Another preferred embodiment of a lift and carrier assembly for a personal-transportation vehicle comprises a first column, a second column telescopically disposed within the first column, a platform assembly pivotally coupled to the second column for supporting the personal-transportation vehicle, and means mounted on the first column for raising and lowering the second column and the platform assembly in relation to the first column on a manual basis.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings:

FIG. 1 is a perspective view of a preferred embodiment of a lift and carrier assembly for a personal-transportation vehicle, installed on an automobile, and with a platform assembly of the lift and carrier assembly in its upper, unfolded position;

FIG. 2 is a perspective view of the lift and carrier assembly shown in FIG. 1, with the platform assembly in its upper, folded position;

FIG. 3 is a perspective view of the lift and carrier assembly shown in FIGS. 1 and 2, with the platform assembly in its lower, unfolded position;

DETAILED DESCRIPTION OF PREFERRED EMBODIMENTS

Figure 19:
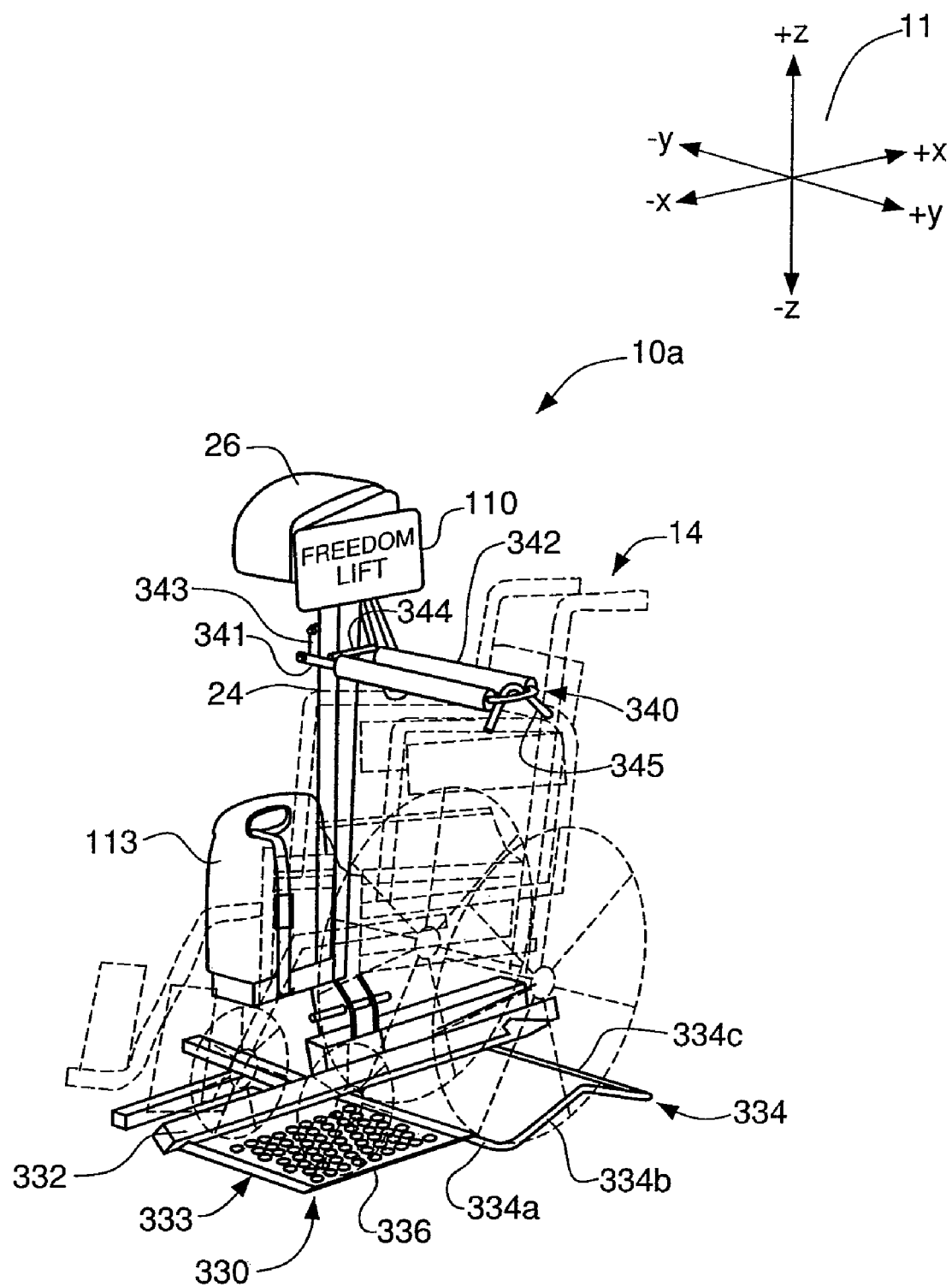
FIG. 19 is a perspective view of the lift and carrier assembly shown in FIGS. 1-17 and 18B, equipped with an alternative embodiment of the platform assembly and having a wheelchair positioned on the platform assembly, with the platform assembly in its upper, unfolded position.
Figure 20:
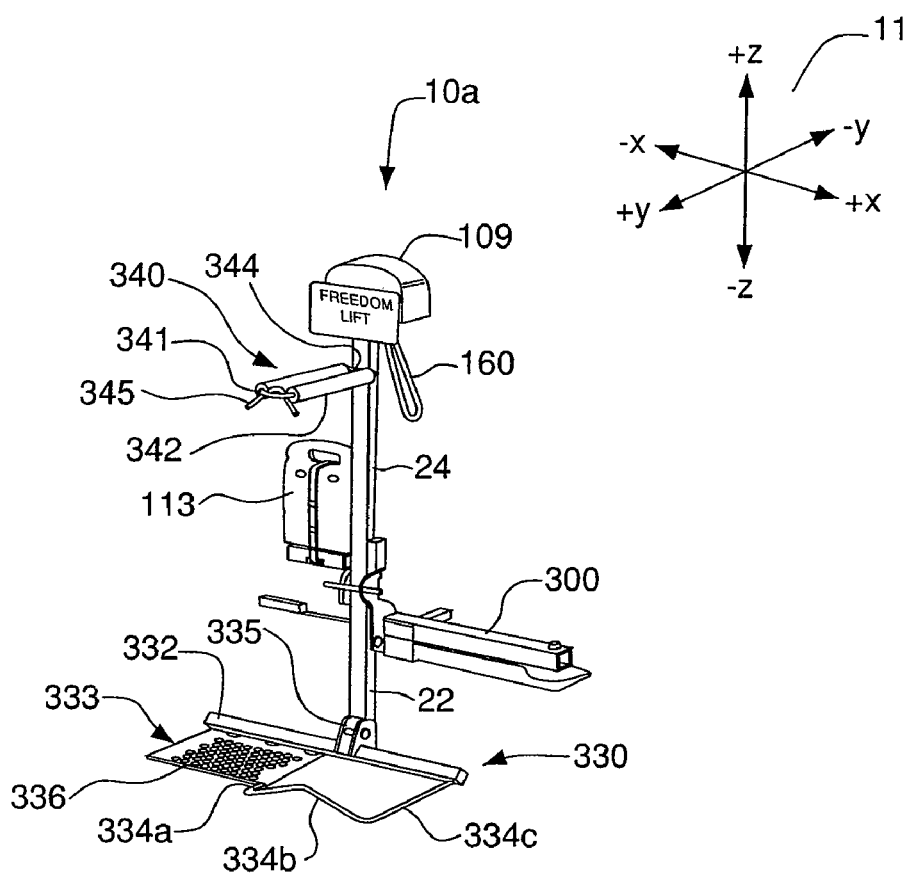
FIG. 20 is a perspective view of the lift and carrier assembly as shown in FIG. 19, with the platform assembly in its lower, unfolded position.
Figure 21:
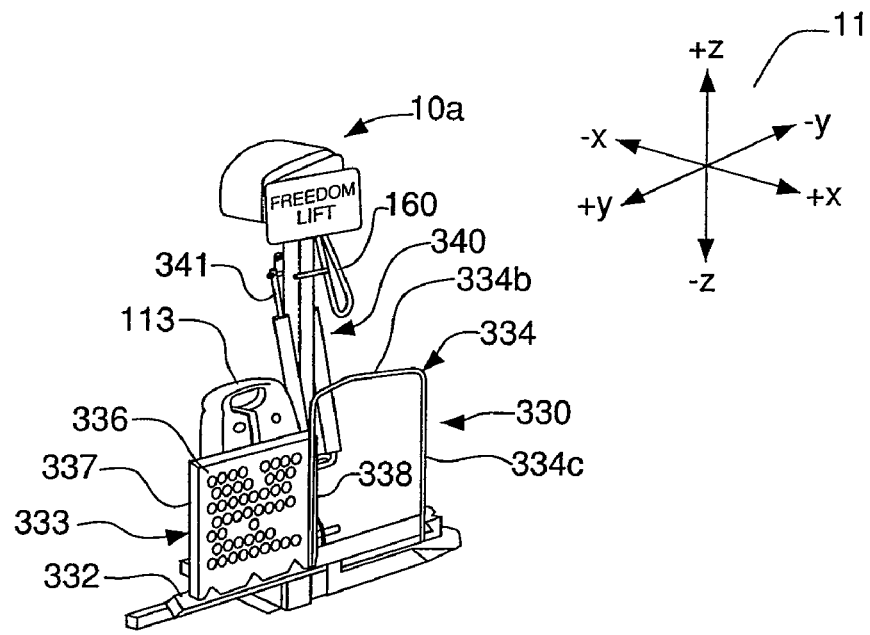
FIG. 21 is a perspective view of the lift and carrier assembly as shown in FIGS. 19 and 20, with the platform assembly in its upper, folded position.

FIGS. 1 to 17 and 18B depict a preferred embodiment of a lift and carrier assembly 10. The lift and carrier assembly 10 is configured for use with an ultra-lite scooter such as the ultra-lite scooter 12 depicted in FIG. 4. Alternative embodiments of the lift and carrier assembly 10 can be configured for use with a wheel chair. For example, FIGS. 19-21 depict a lift and carrier assembly 10a configured for use with a manual wheelchair 14. The lift and carrier assembly can be reconfigured between the embodiments depicted in FIGS. 1-17 and 19-21, as discussed below.

The scooter 12 and the wheelchair 14 are depicted for exemplary purposes only, as the lift and carrier assembly 10 can be used to lift and hold other types of motorized and non-motorized vehicles used for personal transportation.

Moreover, the lift and carrier assembly 10, and alternative embodiments thereof, can be used with scooters other than ultra-lite scooters.

The lift and carrier assembly 10 can be installed on a motorized vehicle, referred to hereinafter as a "transporting vehicle 15." The transporting vehicle 15 is depicted in FIG. 1 as an automobile. The use of this particular type of transporting vehicle is disclosed for exemplary purposes only. The lift and carrier assembly 10 can be installed on other types of transporting vehicles such as mini-vans, pickup trucks, etc.

The scooter 12 or the wheelchair 14 can be driven onto and secured to the lift and carrier assembly 10, transported to another location by the transporting vehicle 15, and driven off the lift can carrier assembly 10.

The lift and carrier assembly 10, as configured for use with the ultra-lite scooter 12, comprises a platform assembly 20. The platform assembly 20 is capable of translating vertically, i.e., upwardly and downwardly, between a lower position shown in FIG. 3, and an upper position shown in FIGS. 1, 2, and 4-6.

The terms "upward" and "downward" refer respectively to the "+z" and "−z" directions denoted on a common coordinate system 11 depicted in the figures. The terms "forward" and "rearward" refer respectively to the "+x" and "−x" directions. These terms, and all other directional terms used throughout the specification, are used for illustrative purposes only, and are not meant to limit the scope of the appended claims.

The lift and carrier assembly 10 also comprises a lifting column 22, an actuator column 24, and a power head 26. The platform assembly 20 is pivotally coupled to the lifting column 22 so that the platform assembly 20 can rotate, or swing, between a substantially horizontal, or unfolded position shown in FIGS. 1 and 3-6, and a substantially vertical, or folded position shown in FIG. 2.

Figure 8A:
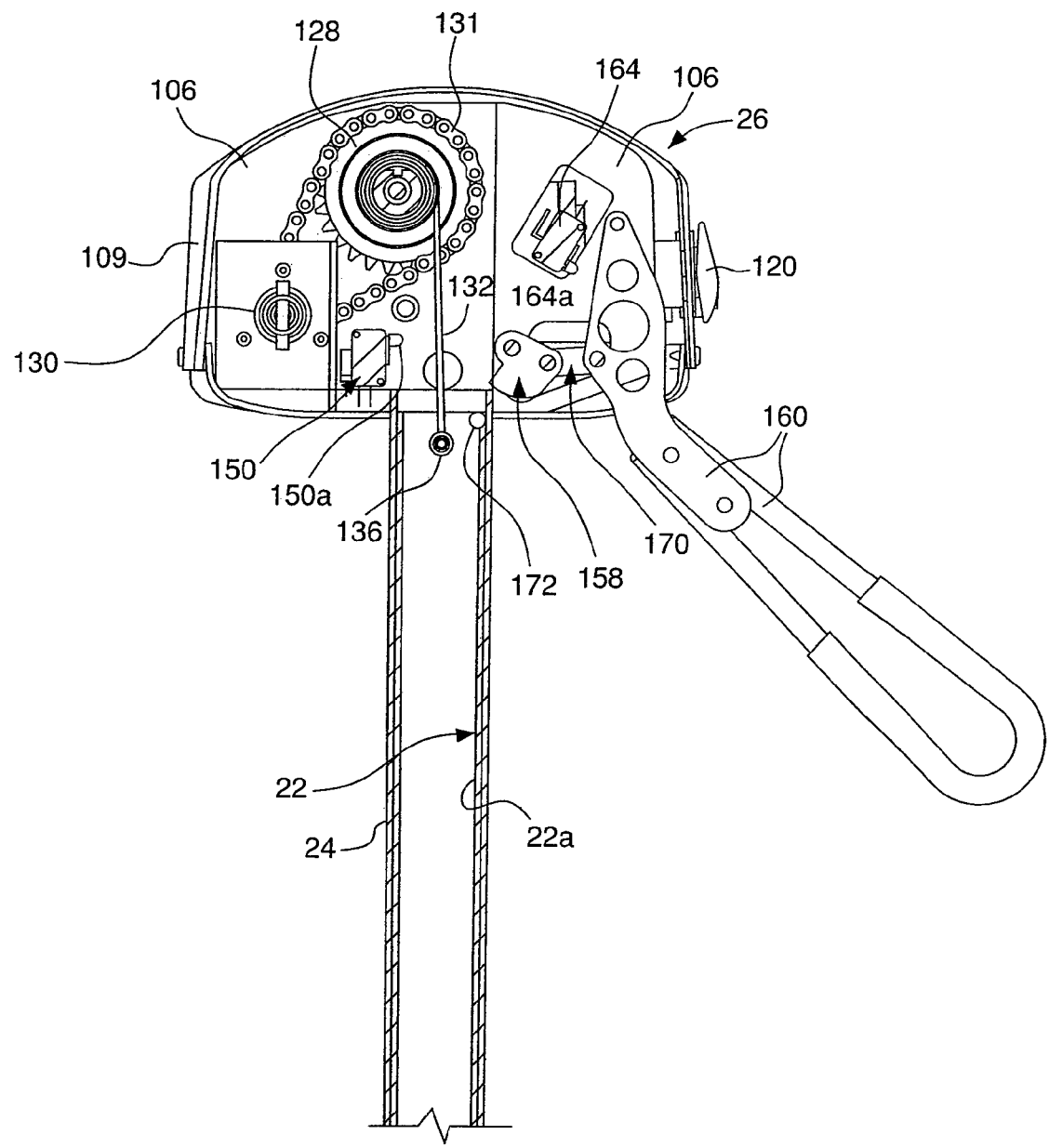
FIG. 8A is a cross-sectional view of the power head, the actuator column, and a lifting column of the lift and carrier assembly shown in FIGS. 1-7, taken through the line "B-B" of FIG. 4, and showing a latch and a latch handle of the power head in their respective second and unlocked positions.
Figure 8B:
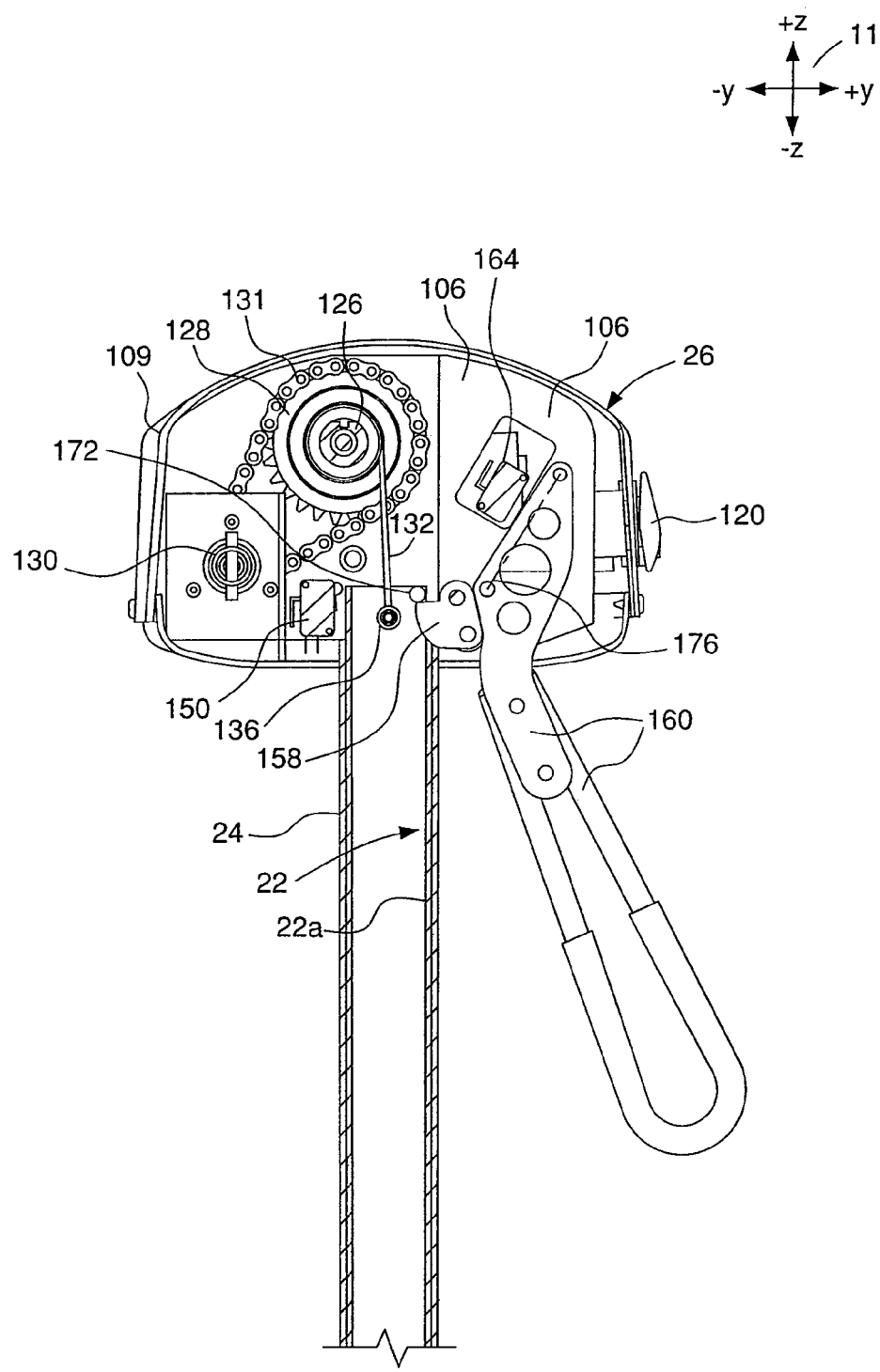
FIG. 8B is a cross-sectional view of the power head, the actuator column, and the lifting column of the lift and carrier assembly shown in FIGS. 1-8A, taken through the line "B-B" of FIG. 4, and showing the latch and the latch handle of the power head in their respective first and locked positions.

The lifting column 22 is telescopically disposed within the actuator column 24 (see FIGS. 8A and 8B). The power head 26 is mounted on an upper end of the actuator column 24. The power head 26, as discussed below, can lift and lower the lifting column 22, and the attached platform assembly 20, in response to user inputs.

Preferably, the lifting column 22 and the actuator column 24 are each formed as a tube having a substantially square cross section. Other configurations for the lifting column 22 and the actuator column 24, e.g., tubes having a substantially circular cross-section, can be used in the alternative.

Figure 4:
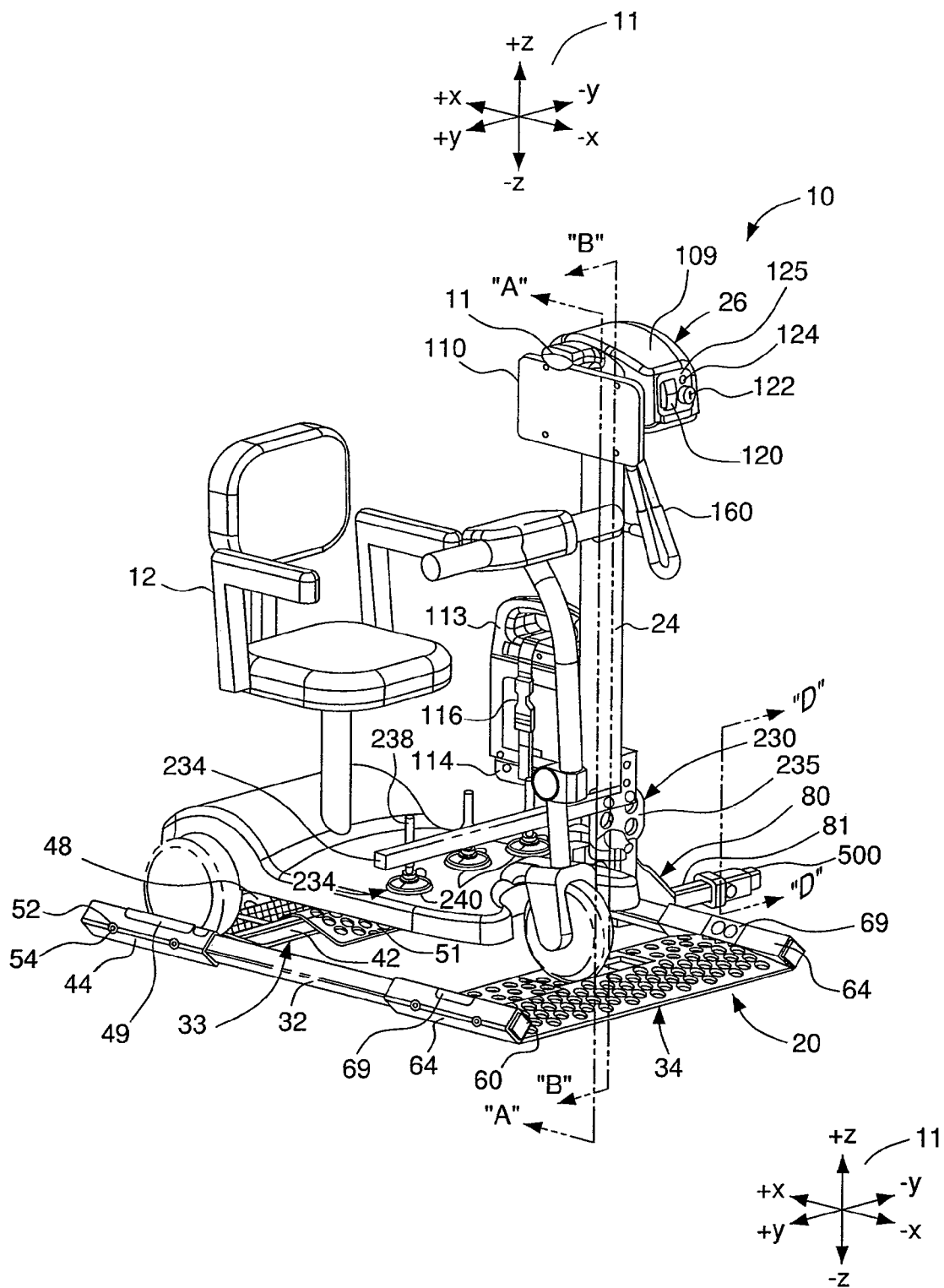
FIG. 4 is a perspective view of the lift and carrier assembly shown in FIGS. 1-3, with the platform assembly in its upper, unfolded position, and with a motorized scooter positioned on the platform assembly.
Figure 28:
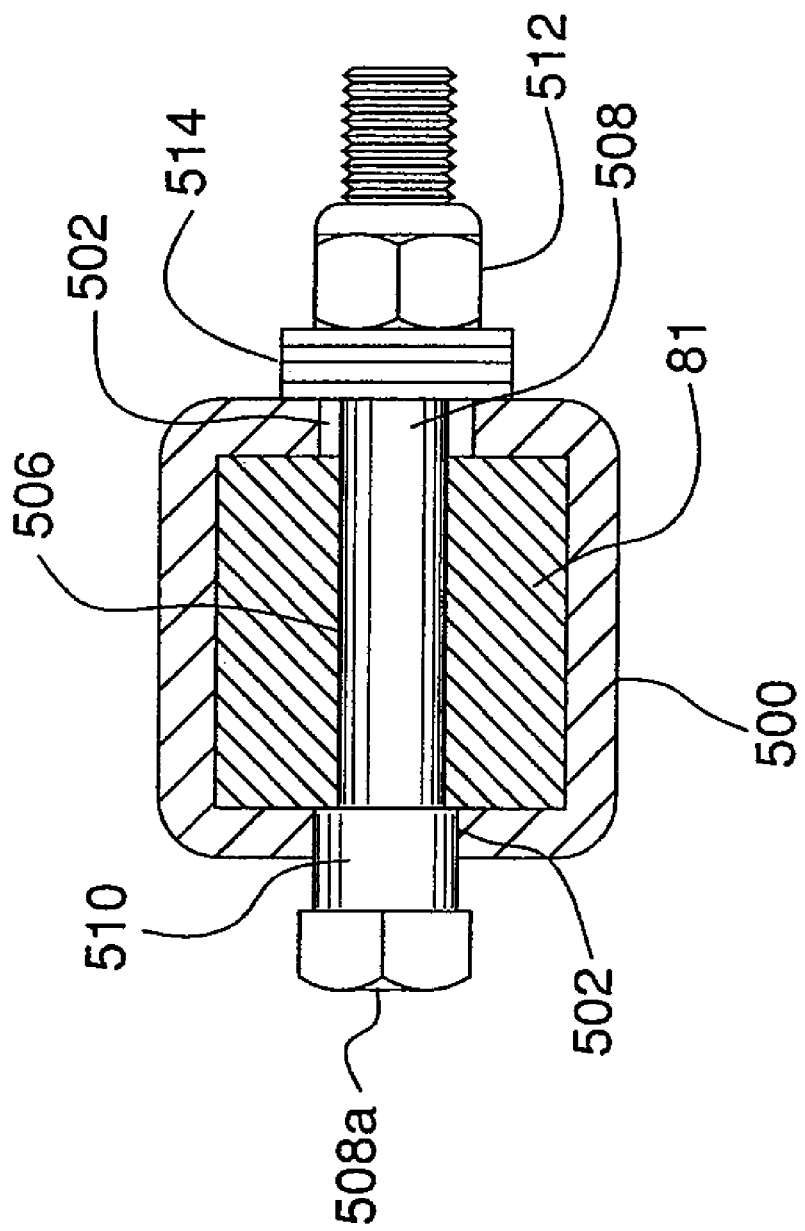
FIG. 28 is a cross-sectional view taken through the line "D-D" of FIG. 4.

The lift and carrier assembly 10 also includes a tongue weldment 80 for mounting the lift and carrier assembly 10 on the transporting vehicle 15 (see FIGS. 6, 13, 15A, and 15B). The tongue weldment 80 comprises a tongue bar 81, and a gusset 82 fixedly coupled to the tongue bar 81 by a suitable means such as welding. The tongue bar 81 mates with a trailer hitch 500, as shown in FIGS. 4 and 28. The trailer hitch 500 preferably is a class II or III trailer hitch. The tongue bar 81 can be secured to the trailer hitch 500 in a manner described below.

The tongue weldment 80 also includes a vertical tongue 83 secured to the actuator column 24 by a suitable means such as welding. The vertical tongue 83 is secured to the gusset 82 by fasteners in the form of bolts 87 and associated nuts 88 (the bolts 87 and nuts 88 are not shown in FIGS. 15A and 15B, for clarity).

Figure 15A:
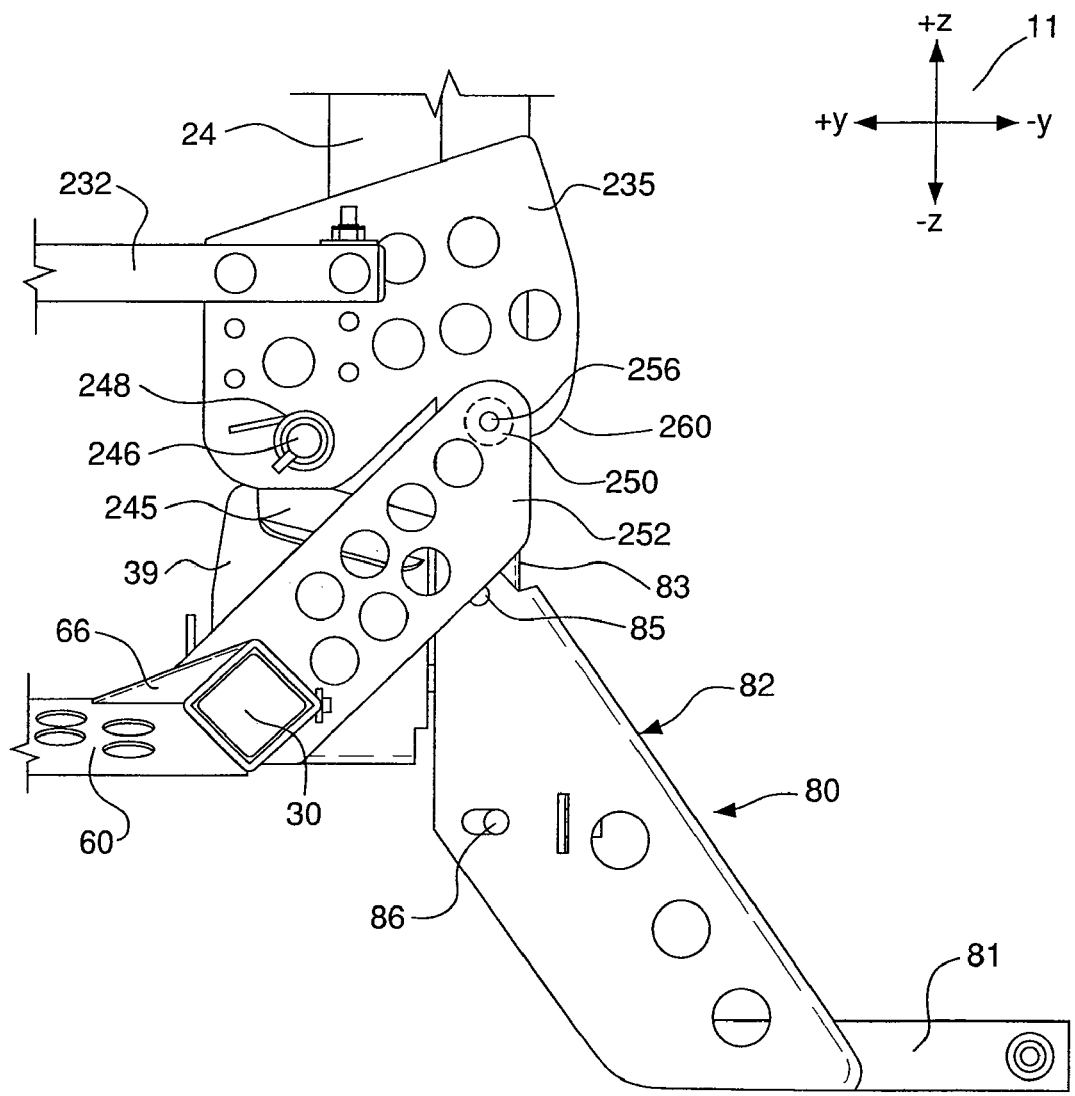
FIG. 15A is a side view of the area designated "C" in FIG. 6.
Figure 15B:
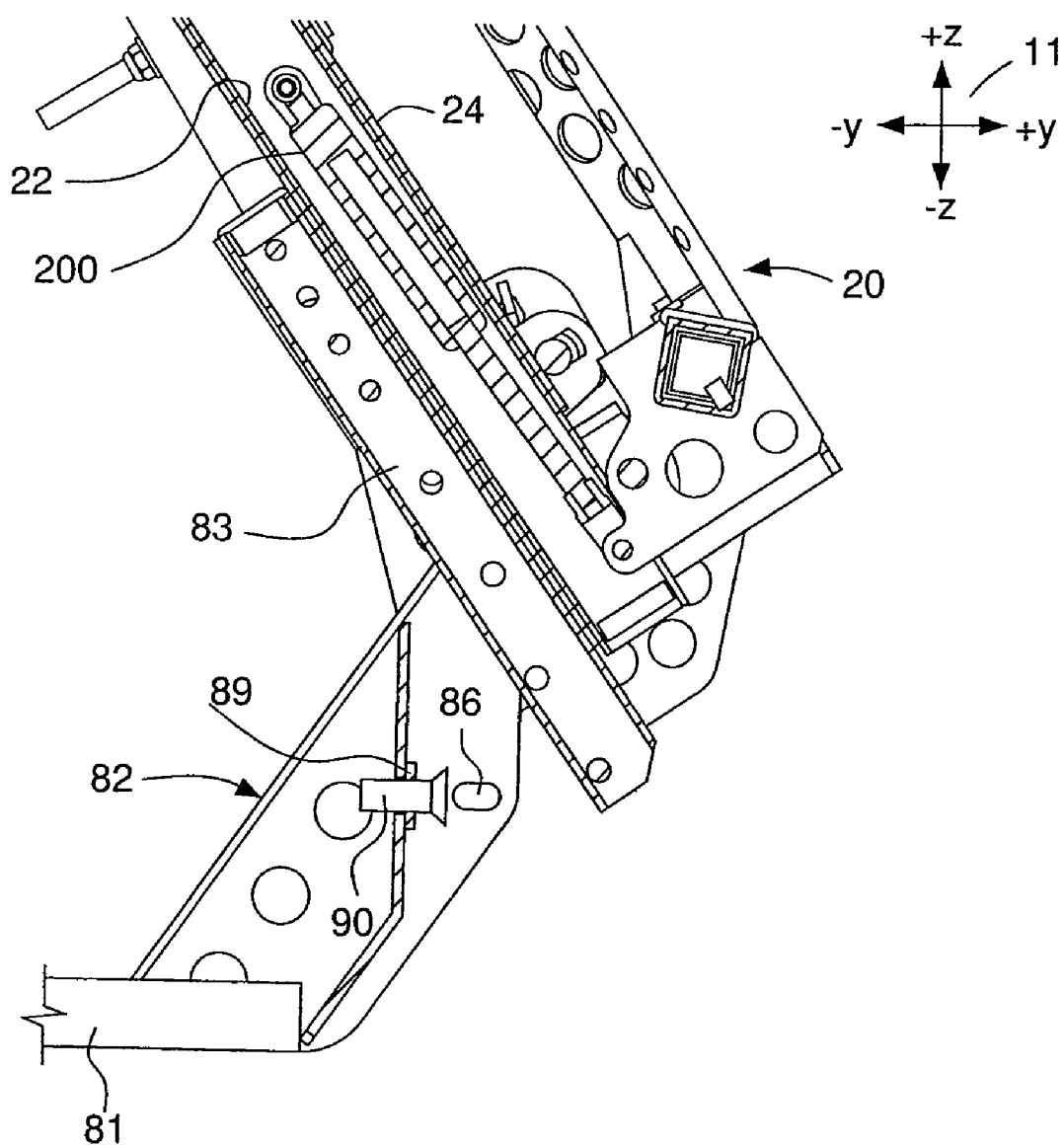
FIG. 15B is a cross-sectional view of the area depicted in FIG. 15A, taken from a perspective rotated approximately 180-degrees from the perspective of FIG. 15A and showing the platform assembly tilted to facilitate access to an adjustment bolt.
Figure 16:
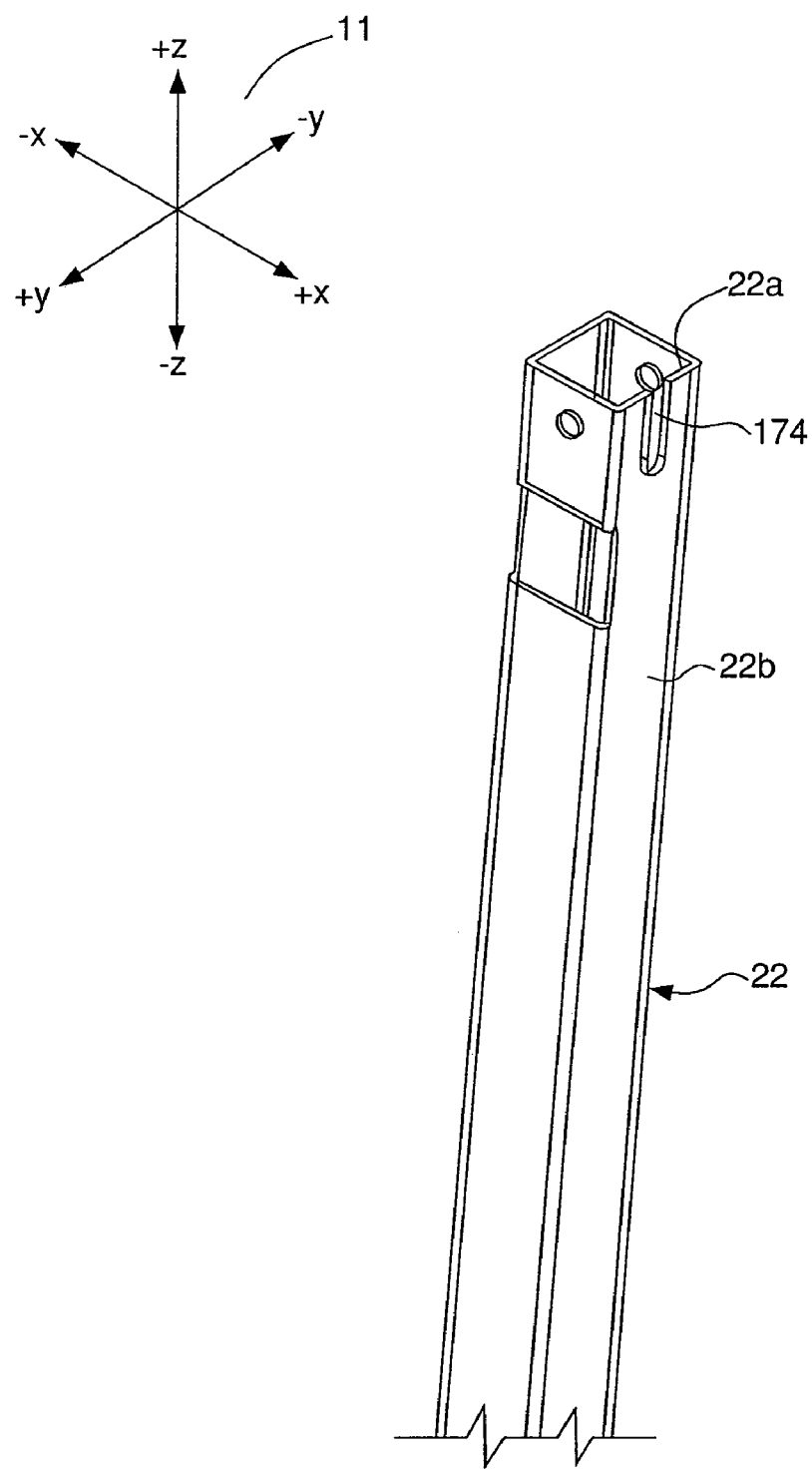
FIG. 16 is a perspective view of the lifting column of the lift and carrier assembly shown in FIGS. 1-15A.

Each side of the gusset 82 has a hole 85 and a slot 86 formed therein (see FIGS. 15A and 15B). The holes 85 are located proximate the upper end of the gusset 82. The slots 86 are located below the holes 85, and are oriented substantially in the horizontal direction.

A forward portion of the gusset 82 is disposed around the vertical tongue 83. The vertical tongue 83 has holes formed therein that substantially align with the holes 85 and the slots 86 formed in the gusset 82. The holes 85 and the associated holes in the vertical tongue 83 each receive one of the bolts 87. The slots 86 and the associated holes in the vertical tongue 83 each receive another of the bolts 87. The bolts 87, in conjunction with the associated nuts 88, secure the vertical tongue 83 to the gusset 82.

The slots 86 allow the orientation of the vertical tongue 83, and the remainder of the platform assembly 10, to be adjusted in relation to the gusset 82, the tongue bar 81, and the trailer hitch 500, as discussed below.

A weld nut 89 preferably is mounted on the gusset 82, as depicted in FIG. 15B. The weld nut 89 receives a flat head bolt 90. The weld nut 89 and the bolt 90 can be used to adjust the orientation of the vertical tongue 83, and the portion of the platform assembly 10 supported by the vertical tongue 83, in relation to the gusset 82, the tongue bar 81, and the trailer hitch 500. In particular, the vertical tongue 83 can be attached to the gusset 82 by inserting one of the bolts 87 through the holes 85 and the associated holes in the vertical tongue 83.

The bolt 90 acts as a stop for the vertical tongue 83. More specifically, contact between the bolt 90 and the vertical tongue 83 can prevent rotation of the vertical tongue 83 in the clockwise direction (from the perspective of FIG. 15B), past the point at which the vertical tongue 83 contacts the bolt 90. The position of the bolt 90 in relation to the weld nut 89 can be adjusted to vary the stop-point of the vertical tongue 83. In other words, the orientation of the vertical tongue 83 at the point where the vertical tongue 83 contacts the bolt 90 can be adjusted by turning the bolt 90 in the clockwise or counterclockwise direction in relation to the weld nut 89. (The vertical tongue 83 can be pivoted around the bolt 87 to provide access to the bolt 90, as shown in FIG. 15B.) The orientation of the platform assembly 20 in relation to the ground is related to the orientation of the vertical tongue in relation to the gusset 82. Hence, the bolt 90 and the weld nut 89 can permit the user to adjust the orientation of the platform assembly 20 in relation to the ground.

The remaining bolt 87 can be inserted through the slots 86 in the gusset 82, and through the associated holes in the vertical tongue 83 once the position of the bolt 90 is adjusted to place the platform assembly 20 in a desired orientation. The elongation of the slots 86 allows the slots 86 and the associated holes in the vertical tongue 83 to align while the relative orientation of the vertical tongue 93 and the gusset 82 varies within a predetermined range, e.g., five degrees. Moreover, the use of the bolt 90 to react the counterclockwise moment on the vertical tongue 83 substantially reduces the clamping force that the bottom-most bolt 87 and nut 88 need to exert on the gusset 82 to restrain the vertical tongue 83 (and the portion of the lift and carrier assembly 10 supported by the vertical tongue 83).

The ability to adjust the orientation of the platform assembly 20 in relation to ground can permit the user to compensate for vehicle to vehicle variations in the orientation of the trailer hitch 500.

The platform assembly 20 comprises a first cross member 30, a second cross member 32, a first platform weldment 33, and a second platform weldment 34 (see FIGS. 2-5). The first cross member 30 is pivotally coupled to the lifting column 22 by a gusset 39 secured to the lifting column 22 by a suitable means such as welding (see FIGS. 3, 15A, 15B, and 17). The lifting column 22 includes a gusset 23 located at a lower end thereof (see FIG. 12). The gusset 39 is pivotally coupled to the gusset 23 by a suitable means such as a bolt or pin.

Preferably, each of the first and second cross members 30, 32 is formed as a tube having a substantially square cross section. The first and second cross members 30, 32 can be configured in other manners in alternative embodiments. For example, the first and second cross members 30, 32 can have a circular cross-sections in the alternative.

The first platform weldment 33 preferably comprises a platform 40, a transverse support 42 positioned forward of the platform, and two outer supports 44. The outer supports 44 are secured to opposite sides of the platform 40, by a suitable means such as welding. Ends of the transverse support 42 are secured to the outer supports 44 by a suitable means such as welding. The first platform weldment 33 also includes gussets 46 secured to the transverse support 42 and the outer supports 44 by a suitable means such as welding, to further secure the transverse support 42 to the outer supports 44. A forward end of the platform 40 is secured to the transverse support 42 by a suitable means such as welding.

The platform 40 preferably is formed from perforated sheet metal. The platform 40 can include two tabs 49 for further securing the platform 40 to the outer supports 44.

The rearward end of the platform 40 can include a raised lip 48 (see FIGS. 3 and 4). The lip 48 can help restrain the rear wheels of the scooter 12 when the scooter 12 is positioned on the platform assembly 20. The lip 48 can be angled, so that the lip 48 contacts the ground when the platform assembly 20 is in its lower position. This feature can make it easier to drive the scooter 12 onto the platform assembly 20 than would otherwise be possible.

The platform 40 can include a tongue 50 that extends from the forward end of the platform 40 (see FIGS. 3 and 4). The tongue 50 can help the front wheel of the scooter 12 traverse the transverse support 42 as the scooter 12 is driven onto the platform assembly 20. Two guides 51 can be mounted on the platform 40, to help guide the front wheel as the scooter 12 is driven onto the platform assembly 20.

Figure 5:
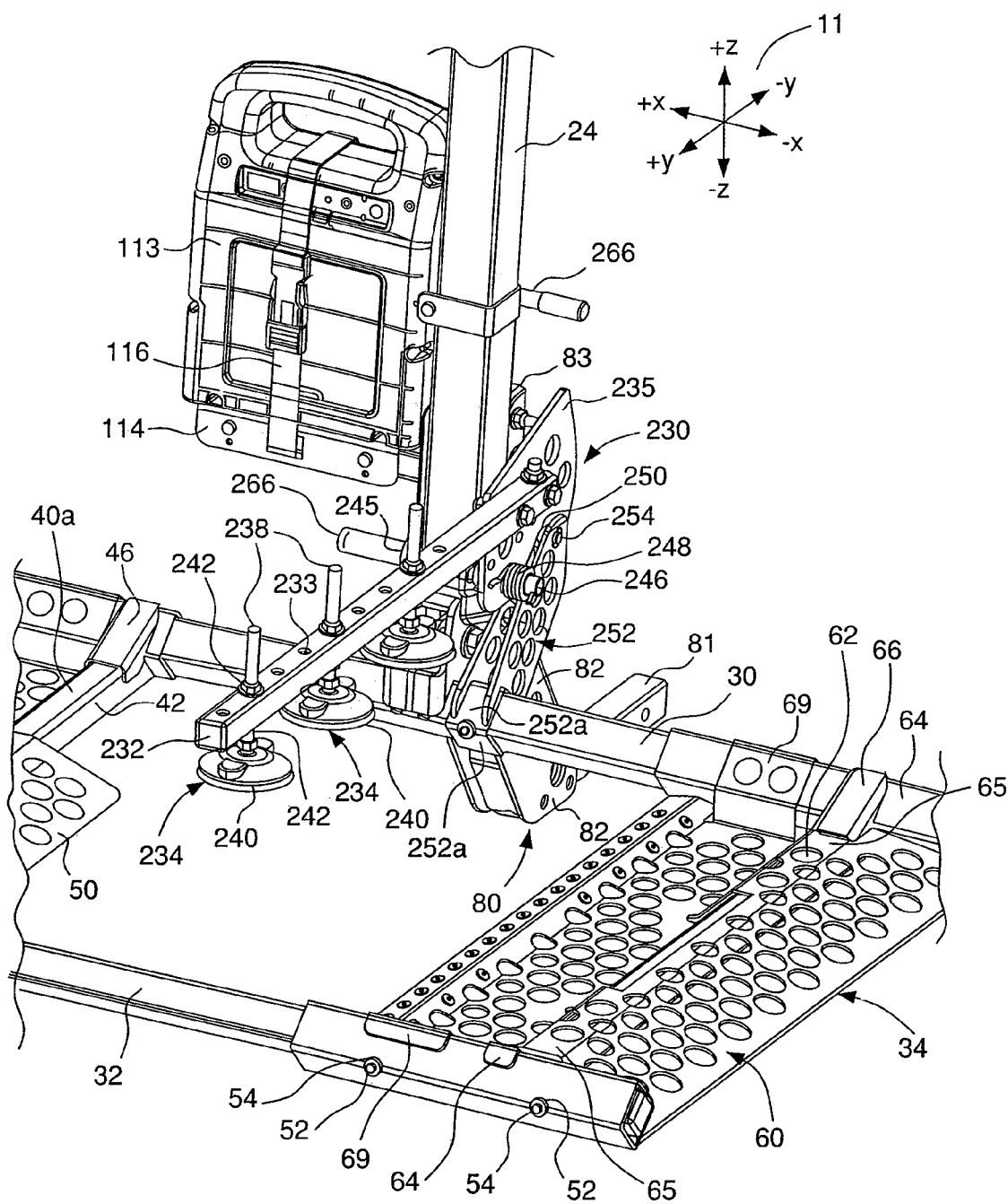
FIG. 5 is a perspective view of the platform assembly and an actuator column of the lift and carrier assembly shown in FIGS. 1-4, with the platform assembly in its upper, unfolded position.

The outer supports 44 are sized to receive a respective one of the first and second cross members 30, 32. The outer supports 44 are each formed as a tube having a substantially square cross section, to match the cross section of first and second cross members 30, 32. Each of the outer supports 44 has two weld nuts 52 mounted thereon for receiving an associated set screw 54 (see FIG. 4; similar features of the second platform weldment 44 are shown in FIG. 5). The set screws 54 secure the outer supports 44 (and the platform 40) to the first and second cross members 30, 32. This arrangement allows the first platform weldment 33 to be slid along the first and second cross members 30, 32 to a desired position that accommodates a particular scooter 12. The set screws 54 can be tightened when the first platform weldment 33 is positioned at a desired location in relation to the first and second cross members 30, 32, and the second platform weldment 34. (The second platform weldment 34, as discussed below, includes similar features that allow the position of the second platform weldment 34 to be adjusted.)

The second platform weldment 34 preferably comprises a platform 60, a transverse support 62, and two outer supports 64. The transverse support 62 extends through two raised portions 65 formed in the platform 40. The transverse support 62 is secured to the raised portions 65 by a suitable means such as welding.

The outer supports 64 are secured to opposite sides of the platform 60, by a suitable means such as welding. Ends of the transverse support 62 are secured to the outer supports 64 by a suitable means such as welding. The second platform weldment 34 also includes gussets 66 secured to the transverse support 62 and the outer supports 64 by a suitable means such as welding, to further secure the transverse support 62 to the outer supports 64.

The platform 60 preferably is formed from perforated sheet metal. The platform 60 can include two tabs 69 for further securing the platform 60 to the outer supports 64.

The rearward end of the platform 60 is angled downward, to make it easier to drive the scooter 12 onto the platform assembly 20 than would otherwise be possible. The portion of the transverse support 62 located between the raised portions 65 of the platform 60 can act as a stop for the front wheel of the scooter 12, when the scooter 12 is driven onto the platform assembly 20.

The outer supports 64 are sized to receive a respective one of the first and second cross members 30, 32. The outer supports 64 are each formed as a tube having a substantially square cross section, to match the cross section of first and second cross members 30, 32. Each of the outer supports 64 has two of the weld nuts 52 mounted thereon for receiving an associated set screw 54 (see FIG. 5). The set screws 54 secure the outer supports 64 (and the platform 60) to the first and second cross members 30, 32. This arrangement allows the second platform weldment 34 to be slid along the first and second cross members 30, 32 to a desired position that accommodates a particular scooter 12. The set screws 54 can be tightened when the second platform weldment 34 is positioned at a desired location in relation to the first and second cross members 30, 32, and the first platform weldment 32.

In practice, the user can adjust the respective positions of the first platform weldment 33 and the second platform weldment 34 together, to tailor the configuration of the platform assembly 20 to the wheelbase of the scooter 12. The ability to adjust the respective positions of the first and second platform weldments 33, 34 permits the lift and carrier system 10 to be customized to accommodate different types of scooters, with minimal effort on the part of the user. Moreover, the first and second platform weldments 33, 34 can be configured to accommodate drive-on of the scooter 12 from the left or right hand directions. In other words, the relative positions of the first and second platform weldments 33, 34 can be reversed. Configuration of the platform assembly 20 for drive-on from left or right hand direction typically takes place prior to delivery of the lift and carrier assembly 10 to the user.

The lift and carrier assembly 10 also comprises a power head 26 for lifting and lowering the platform assembly 20. The power head 26 comprises a front bracket 104, and a motor mount 106 (see FIGS. 7-10). The front bracket 104 and the motor mount 106 are each secured to the actuator column 24 by a suitable means such as fasteners. The power head 26 also includes an electrically-powered motor 108 mounted on the motor mount 106, and a cover 109. The power head 26 can also include a license plate holder 110 mounted on the cover 109, and a light 111 mounted on the cover 109, above the license plate holder 110 (see FIG. 7). Preferably, the license plate holder 110 is mounted on the cover 109 using hinges 112. The hinges 112 permit the license plate holder 110 to be pivoted, to provide access to the portion the cover 109 normally hidden by the license plate holder 110.

The lift and carrier assembly 10 can be equipped with a rechargeable battery 113 that provides electrical power for the motor 108 and the other electrical components of the lift and carrier assembly 10 (see FIGS. 3-5). The battery 113 can be supported by a bracket 114 secured to the actuator column 24 by a suitable means such as fasteners. The battery 113 can be held on the bracket 114 by a strap 116.

The use of the battery 113 can simplify installation of the lift and carrier assembly 10 on the transporting vehicle 15, by obviating the need to install wiring between the transporting vehicle 15 to the lift and carrier assembly 10 to provide electrical power to the lift and carrier assembly 10. Use of the battery 113 can also reduce the amount of externally-run wiring on the lift and carrier assembly 10.

Figure 6:
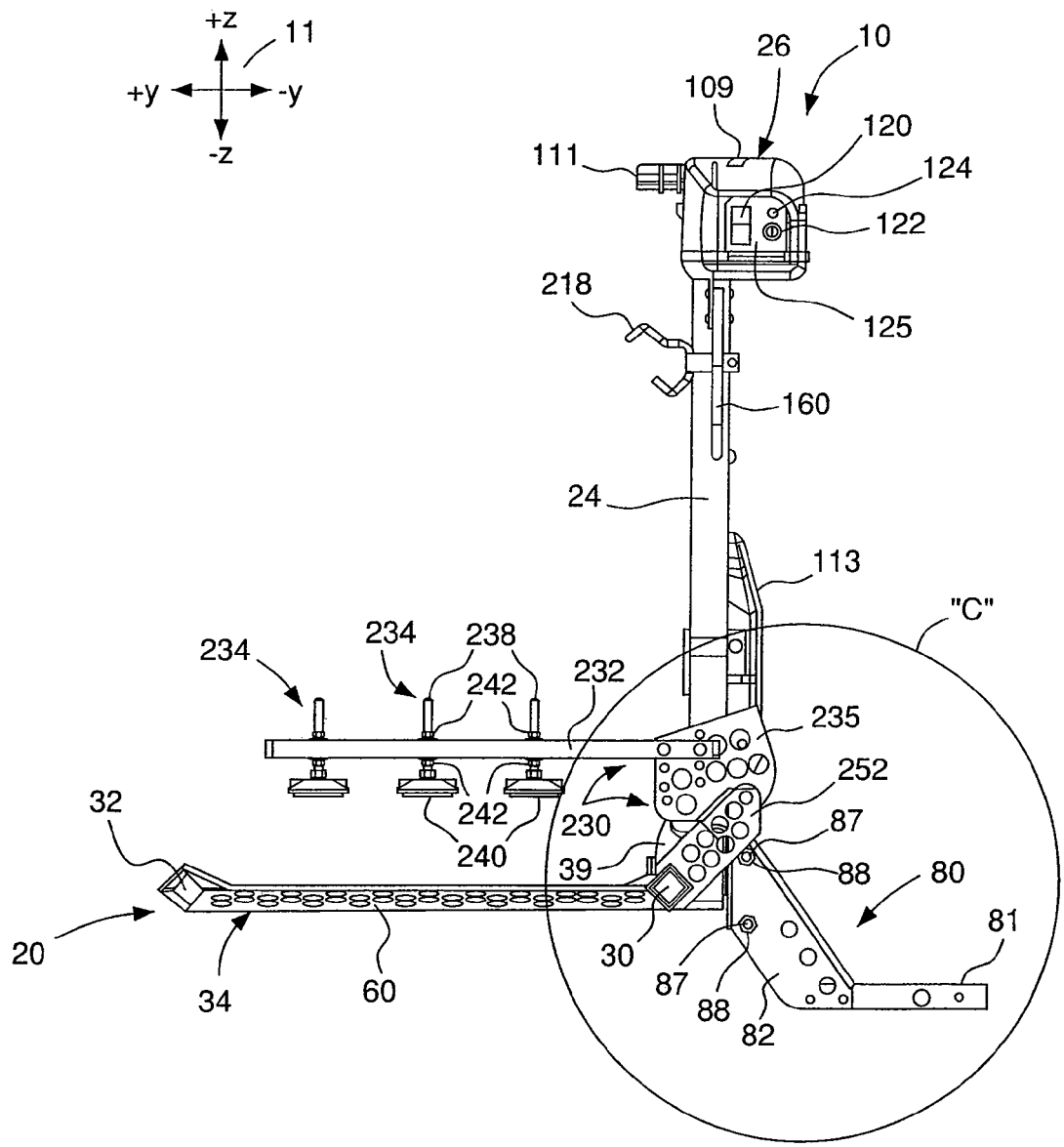
FIG. 6 is a perspective view of the lift and carrier assembly shown in FIGS. 1-5, with the platform assembly in its upper, unfolded position.

The power head 26 includes a rocker switch 120, a key switch 122, and a first indicator light 124 (see FIGS. 4 and 6). The rocker switch 120, key switch 122, and first indicator light 124 are mounted on a panel 125. The panel 125, in turn, is mounted on the cover 109.

The rocker switch 120 is electrically connected to the motor 108. The rocker switch 120 permits the user to activate the motor 108 to raise and lower the platform assembly 20. In particular, depressing one side of the rocker switch 120 causes the rocker switch 120 to generate an output that activates the motor 108 in the first direction. Depressing the other side of the rocker switch 120 causes the rocker switch 120 to generate an output that activates the motor 108 in the second direction. Activation of the motor 108 in the first and second directions, as explained below, raises and lowers the platform assembly 20.

The key switch 122 is movable between an "on" and an "off" position. The key switch 122 receives a key (not shown). The key switch 122 can be moved between the off and on positions only when the key is inserted therein. The key switch 122 is electrically connected to the electrical circuit between the motor 108 and the rocker switch 120, so that the rocker switch 120 can activate the motor 108 only when the key switch 122 is in the on position.

The power head 26 also comprises a spool 126, and a first sprocket 128 (see FIGS. 7-10). The first sprocket 128 is rotatably mounted on the front bracket 104 and the motor bracket 106, i.e., the first sprocket 128 is mounted on the front bracket 104 and the motor bracket 106 so that the first sprocket 128 can rotate in relation to the front bracket 104 and the motor bracket 106. The spool 126 is mounted on the first sprocket 128 so that the spool 126 rotates with the first sprocket 128.

The power head 26 further comprises a second sprocket 130. The second sprocket 130 is rotatably mounted on the front bracket 104 and the motor bracket 106. The second sprocket 130 is secured to an output shaft 117 of the motor 108, so that activation of the motor 108 in the first and second directions causes the second sprocket 130 to rotate in a counterclockwise and a clockwise direction, respectively (from the perspective of FIGS. 8A-9).

The second sprocket 130 is coupled to the first sprocket 128 by way of a chain 131 so that rotation of the second sprocket 130 imparts rotation to the first sprocket 128 and the spool 126, in a corresponding clockwise or counterclockwise direction.

A first end of a strap 132 is secured to the spool 126. Rotation of the spool 126 in the counterclockwise direction, in response to activation of the motor 108 in the first direction, causes the strap 132 to be drawn onto the spool 126, thereby causing a second end of the strap 132 to move upward. Rotation of the spool 126 in the clockwise direction, in response to activation of the motor 108 in the second direction, causes the strap 132 to be unwind from the spool 126, thereby causing the second end 132 to move downward.

The second end of the strap 132 is secured to a pin 136 located within the lifting column 22 (see FIGS. 8A and 8B). The pin 136 is secured to the lifting column 22, proximate an upper end 22a thereof. The pin 136 extends between opposing sides of the lifting column 22, and is approximately centered in the lifting column 22 as shown in FIGS. 8A and 8B. Upward and downward movement of the second end of the strap 132 thus imparts a corresponding movement the lifting column 22, and the attached platform assembly 20. Hence, the platform assembly 20 can be raised and lowered by activation of the motor 108 in the respective first and second directions.

The pin 136 can be accessed and removed from the lifting column 22 by way of a hole 140 formed in the front bracket 104, when the cover 109 of the power head 26 is removed. This feature can facilitate replacement and inspection of the strap 132 with minimal disassembly of the power head 26.

The use of a strap such as the strap 132 to lift the platform assembly 20, it is believed, can lower the complexity, cost, and weight of the lift and carrier assembly 10 in comparison to a lift and carrier assembly that utilizes a drive screw to perform the lifting function.

The power head 26 also comprises a first limit switch 150. The first limit switch 150 is electrically coupled to the electrical circuit between the rocker switch 120 and the motor 108 (see FIG. 11). In addition, the first limit switch 150 is electrically coupled the first indicator light 124. The first limit switch 150 is mounted on the front bracket 104. The first limit switch 150 is positioned so that the upper end 22a of the lifting column 22 contacts a roller 150a of the first limit switch 150 as the platform assembly 20 reaches its upper position, as shown in FIG. 8B.

The noted contact between the roller 105a and the lifting column 22 activates the first limit switch 150, thereby causing the first limit switch 150 to generate an electrical output. The electrical circuit between the rocker switch 120 and the motor 108 is configured so that the electrical output of the first limit switch 150 prevents the rocker switch 120 from activating the motor 108 in the first direction. Hence, the motor 108 cannot raise the platform assembly 20 past the point at which the upper end 22a of the lifting column 22 contacts a roller 150a of the first limit switch 150.

The first limit switch 150 thus provides a "soft" electrical stop that interrupts the upward movement of the platform assembly 20 as the platform assembly 20 reaches its upper position. The use of the first limit switch 150 can reduce or substantially eliminate the potential for the platform assembly 20 to experience a potentially damaging "hard" mechanical stop (also known as "deadheading"). The first limit switch 150 can also reduce the potential for motor stall associated with a hard stop.

The first limit switch 150 also allows the platform assembly 20 to be precisely positioned each time the platform assembly 20 is raised to its upper position. Hence, pre-adjusted features on the lift and carrier assembly 10 that hold the ultra-lite scooter 12 (or other personal-transportation vehicle) in position on the platform assembly 20 can provide maximum clamping force on a consistent basis.

The power head 26 also comprises a latch 158, and a latch handle 160 (see FIGS. 8A and 8B). The latch 158 and the latch handle 160 function as a mechanical interlock that reduces the potential for the platform assembly 20 to be inadvertently lowered from its upper position. The latch 158 and the latch handle 160 can also help to reduce the force on the strap 132 when the platform assembly 20 is in its upper position.

The latch 158 and the latch handle 160 are each pivotally coupled to the front bracket 104 and the motor bracket 106 by a respective pin or other suitable means. The latch 158 can pivot between a first position (FIG. 8B) and a second position (FIG. 8A). The latch handle assembly 108 can pivot between a first, or "locked," position (FIG. 8B) and a second, or "unlocked," position (FIG. 8A).

The latch 158 is mechanically coupled to the latch handle 160 by a link 170 (see FIG. 8A). In particular, the latch 158 is pivotally coupled to a first end of the link 170, and the latch handle 160 is pivotally coupled to a second end of the link 170.

The latch 158, latch handle 160, and link 170 are configured so that movement of the latch handle 160 between its locked and unlocked positions causes the latch 158 to pivot between its first and second positions. In other words, the latch 158 will remain in its first position while the latch handle 160 is in its locked position, and the latch 158 can be moved from its first to its second position by movement of the latch handle 160 from its locked to its unlocked position.

A second pin 172 located within the lifting column 22, proximate the upper end 22*a* thereof (see FIGS. 8A and 8B). The second pin 172 is located proximate a first side 22*b* of the lifting column 22. A cutout 174 is formed in the first side 22*b* to provide access to the second pin 172 (see FIG. 16).

The latch 158 engages the second pin 172 when the latch 158 is in its first position, and the platform assembly 20 is in its upper position, i.e., when the lifting column 22 is at the upper end of its range of travel, as shown in FIG. 8B. In particular, movement of the latch handle 160 toward its locked position when the platform assembly 20 is in its upper position causes the latch 158 to rotate in a clockwise direction (from the perspective of FIGS. 8A and 8B). The latch 158 enters the lifting column 22 by way of the cutout 174, and contacts the second pin 172. Further movement of the latch 158 lifts the second pin 172 into the position shown in FIG. 8B, thereby removing at least some of the weight of the lifting column 22 and the platform assembly 20 from the strap 132.

The latch 158 thus helps to support the actuator column 22 and the platform assembly 20. This feature can reduce the potential for failure of the strap 132, particularly when the lift and carrier assembly 10 is subjected to loads caused by bumping, jarring, or bouncing of the transporting vehicle 15. The latch 158 also acts as a mechanical interlock that reduces the potential for the platform assembly 20 to be lowered on an inadvertent basis, as the latch 158 will prevent the second pin 172 and the attached lifting column 22 from moving downward while the latch 158 is in its first position.

The latch 158 and the latch handle 160 are configured so that the latch 158 rotates out of the way, in the counterclockwise direction, in response to contact with the actuator column 22 during movement of the platform assembly 20 from its lower to its upper position, if the latch 158 is not in its second position as the platform assembly 20 is raised.

The latch 158, latch handle 160, and link 170 are configured so that the pivot point between the link 170 and the latch assembly 160 is in an over-center position when the latch handle 110 is in its locked position. In other words, the link 170 pivots past a toggle line 176 denoted in FIG. 8B, when the latch handle 160 moves from its unlocked to its locked position. Hence, the link 170 must be moved slightly upward, against the downward force on the pin 172, to move the latch handle 110 from away from its locked unlocked position. This feature helps to retain the latch handle 110 in its locked position which, in turn, helps to maintain the latch 158 in its first position supporting the lifting column 22 and the platform assembly 20. (The ability to precisely position the platform assembly 20 in its upper position using the limit switch 150 can help to ensure that the latch handle "snaps" into its locked position each time the platform assembly 20 is raised and the latch handle 160 is moved to its locked position.)

The power head 26 preferably includes features that permit the position of the first limit switch 150 to be adjusted in relation to the front bracket 104. In particular, a switch block 153 of the first limit switch 150 is mounted on the front bracket 104 by guide screws 154 (see FIG. 7). Each guide screw 154 is accommodated by a corresponding slot 155 formed in the front bracket 104 (only one of the slots 155 is visible in FIG. 7).

Figure 7:
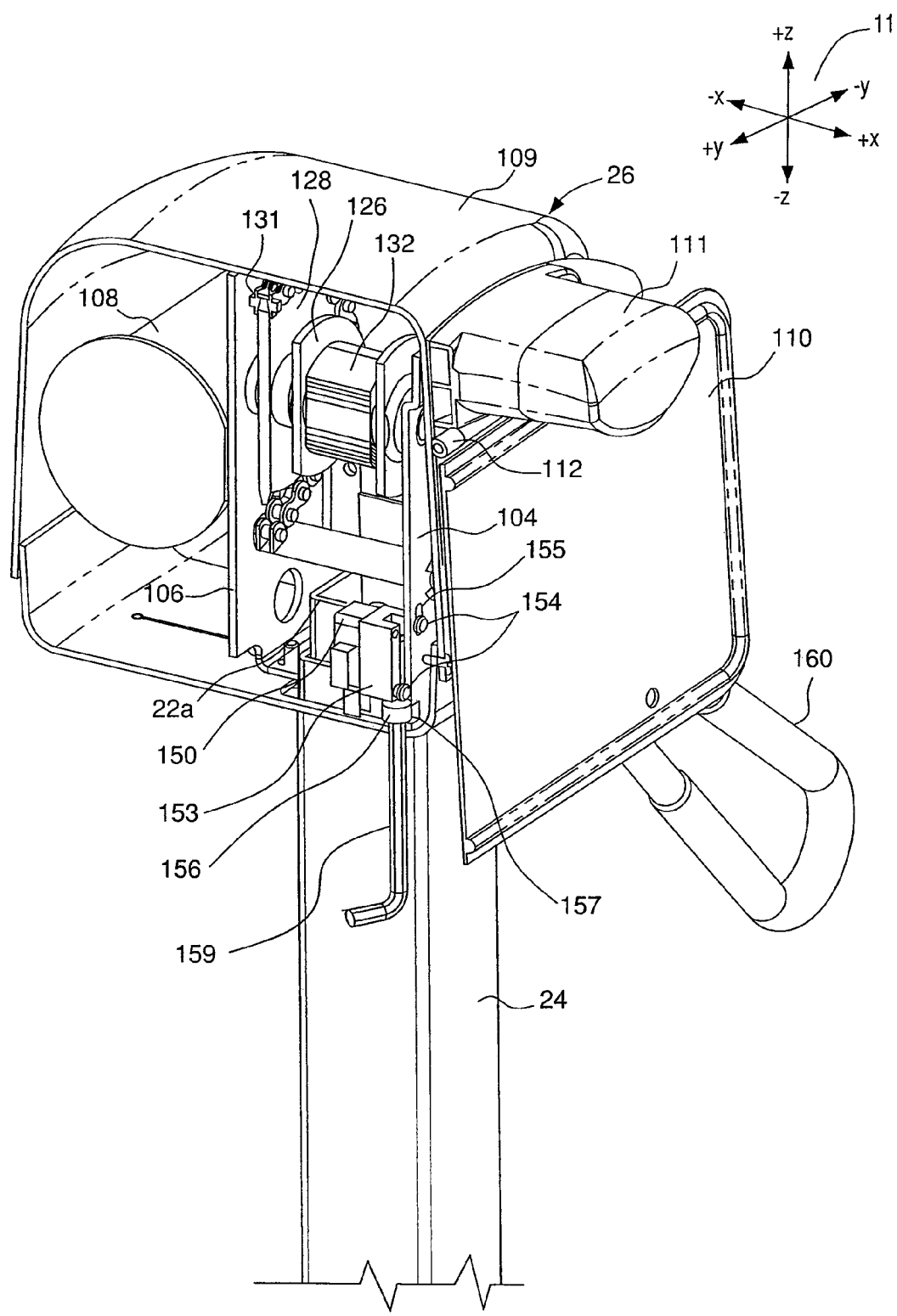
FIG. 7 is a cross-sectional view of a power head and the actuator column of the lift and carrier assembly shown in FIGS. 1-6, taken through the line "A-A" of FIG. 4.

The switch block 153 has a threaded hole formed therein for receiving a bolt 156. The front bracket 104 has a hole 157 formed therein that captures the head of the bolt 156, as shown in FIG. 7. The bolt 156 is accessible from below the power head 26, through a hole formed in the cover 109.

An allen wrench 159 or other suitable tool can be inserted through the access hole in the cover 109 to engage the head of the bolt 156. The guide screws 154 retain the first limit switch 150 on the front bracket 104. The slots 155 permit the first limit switch 152 to translate upward and downward by a predetermined amount, in response to the torque exerted on the switch block 153 by the bolt 156 (the position of the bolt 156 remains constant as the bolt 156 is rotated, because the head of the bolt 156 is captured by the hole 157). Varying the position of the first limit switch 150 varies the point at which the lifting tube 22 will contact the roller 150*a*, thereby changing the stop point for the platform assembly 20. This feature can be utilized by the user to provide relatively fine adjustment of the stopping point of the lifting column 22 and the platform assembly 20. Such adjustment may be necessary over time to ensure that the latch 158 properly engages the second pin 172.

Figure 11:
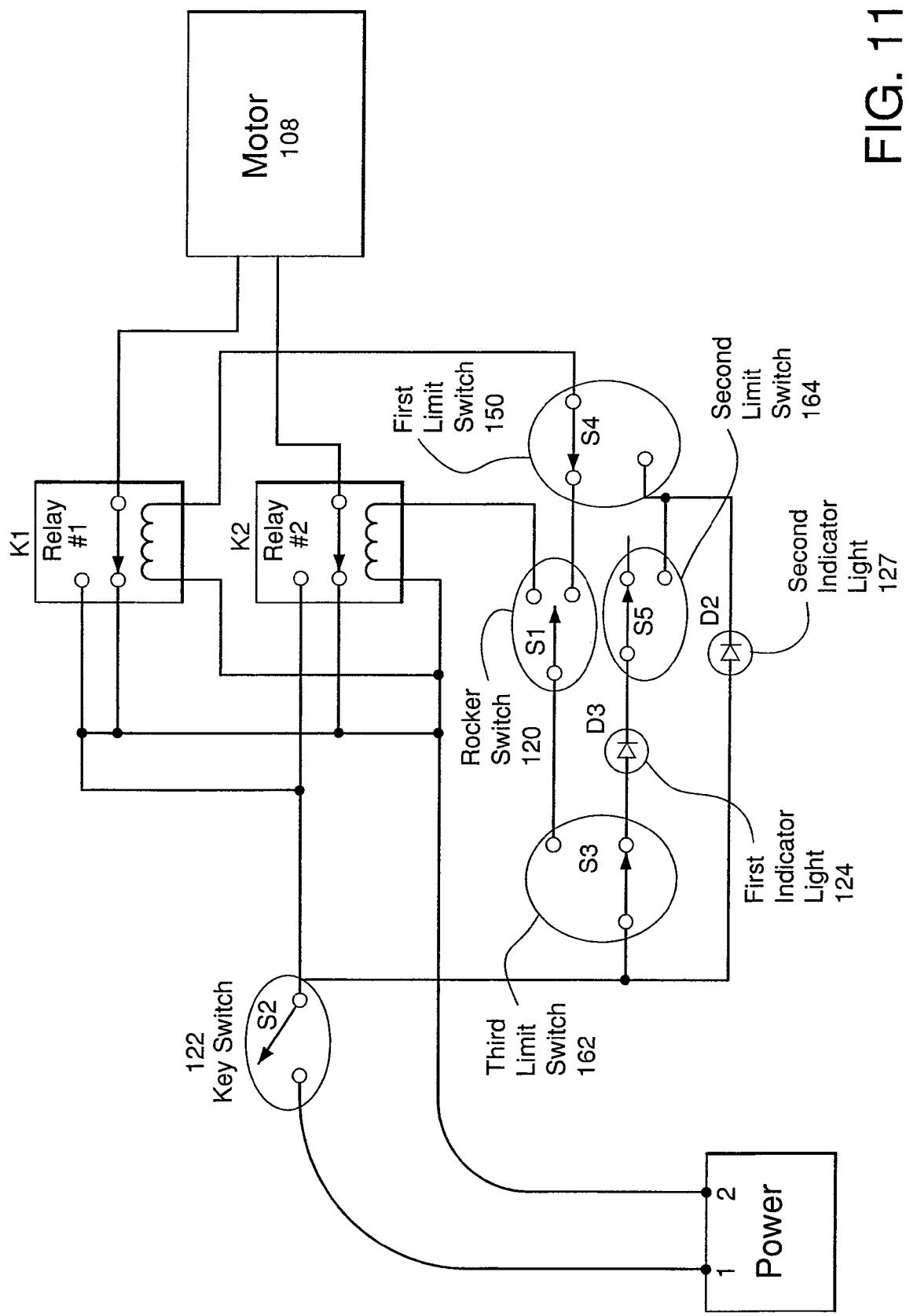
FIG. 11 is a block diagram depicting electrical components of the lift and carrier assembly shown in FIGS. 1-10.

The power head 126 preferably comprises a second indicator light 127 mounted on an underside of the cover 109 (see FIG. 11). The second indicator light is electrically coupled to the first limit switch 150 so that activation of the first limit switch 150 causes the second indicator light 127 to illuminate. The second indicator light 127 thus can be used as an indication that the upward movement of the platform assembly 20 has been interrupted by the limit switch 150, rather than stalling of the motor 108. This indication can assist an installer in adjusting the position of the first limit switch 150.

Figure 9:
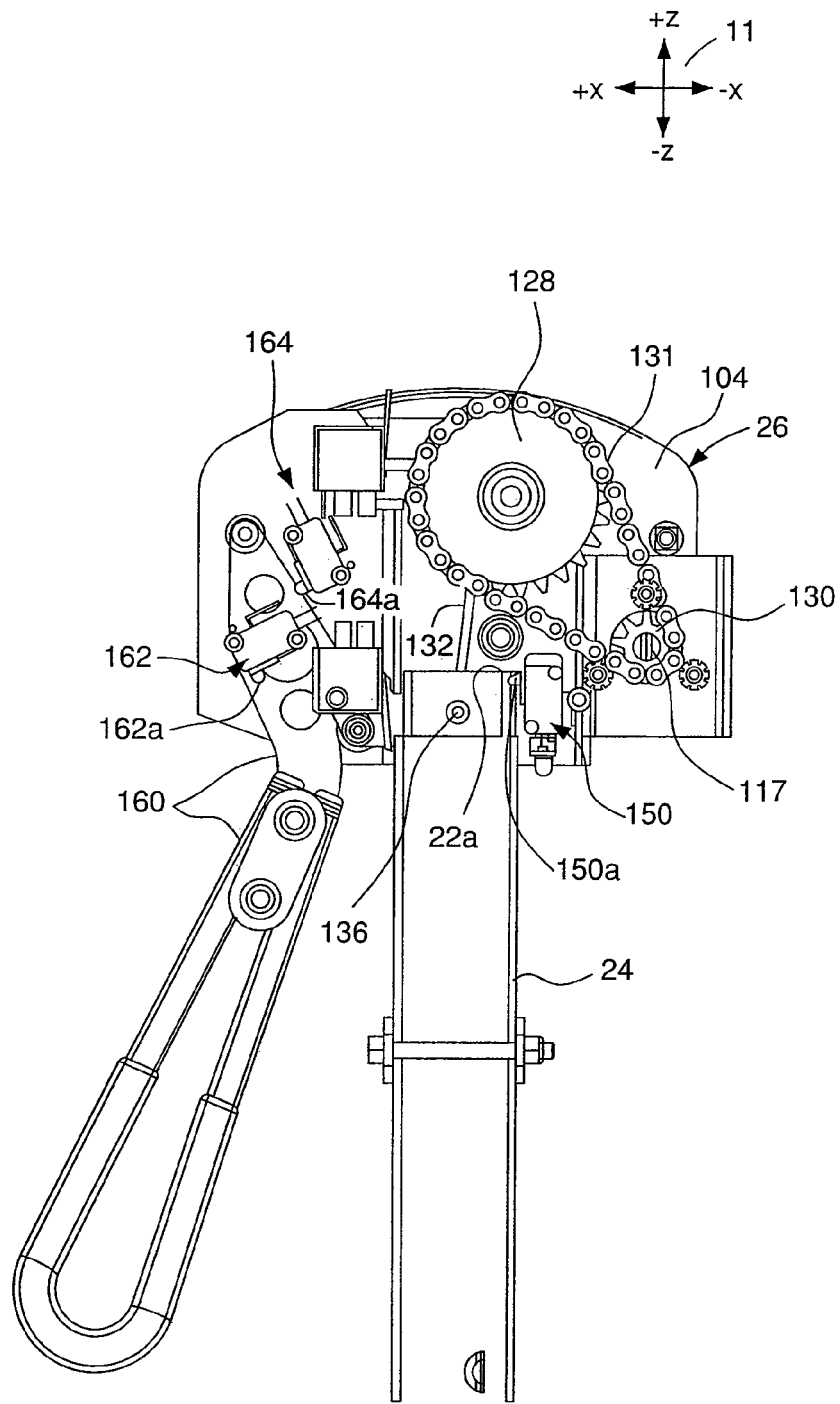
FIG. 9 is a rear view of the power head, the actuator column, and the lifting column of the lift and carrier assembly shown in FIGS. 1-8B, with a cover and a motor mount of the power head removed.
Figure 10:
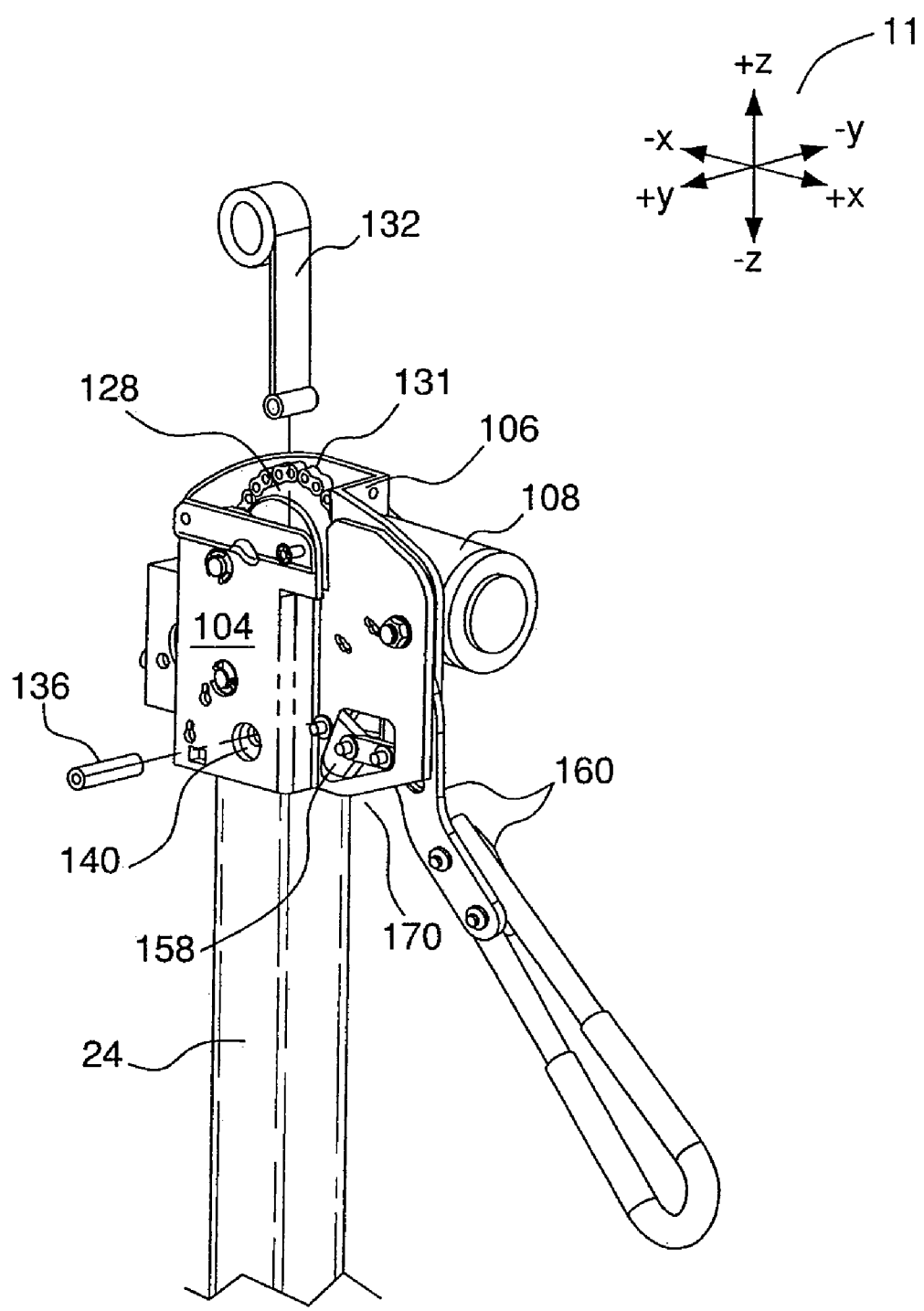
FIG. 10 is a front perspective view of the power head and the actuator column of the lift and carrier assembly shown in FIGS. 1-9, with a cover of the power head removed and showing the power head in a partially disassembled condition.

The power head 26 further comprises a second limit switch 164 (see FIG. 9). The second limit switch 164 is mounted on the front bracket 104 so that latch handle 160 contacts a roller 164*a* on the second limit switch 164 when the latch handle 160 is in the locked position.

The second limit switch 164 is electrically coupled to the first indicator light 124 (see FIG. 11). The noted contact between the roller 164*a* and the latch handle 160 activates the second limit switch 164, thereby causing the second limit switch 164 to generate an electrical output.

The first limit switch 150 generates an electrical output when the platform assembly 20 reaches its upper position, as discussed above. The first indicator light 124 is configured to illuminate only in response to the outputs of both the first and second limit switches 150, 164. The first indicator light 124 therefore illuminates only when the platform assembly 20 is in its upper position, and the latch handle 160 is in its locked position. The first indicator light 124 thereby provides the user with a positive visual indication that the platform assembly 20 is secured in its upper position.

The power head 26 further comprises a third limit switch 162 (see FIGS. 8A-9). The third limit switch 162 is mounted on the motor mount 106 so that the second end of the link 170 contacts a roller 162*a* on the third limit switch 162 when the latch handle 160 is in the unlocked position.

The third limit switch 162 is electrically coupled to the electrical circuit between the motor 108 and the rocker switch 120 (see FIG. 11). The noted contact between the roller 162*a* and the latch handle 160 activates the third limit switch 162, thereby causing the third limit switch 162 to generate an electrical output. The electrical circuit between the rocker switch 120 and the motor 108 is configured so that the rocker switch 120 cannot activate the motor 108 in the second direction, unless the electrical circuit is receiving the output of the third limit switch 162. In other words, the third limit switch 162 prohibits activation of the motor 108 in the second direction, unless the latch handle 160 has been moved fully into its unlocked position.

The use of the third limit switch 162 therefore can substantially reduce or eliminate the potential for the platform assembly 20 to be lowered while the latch 158 is not fully disposed in its second position, i.e., while the latch 158 is not fully out of the path of travel of the lifting column 22.

The lift and carrier assembly 10 preferably includes a biasing device for biasing the platform assembly 20 toward its folded position. This feature can assist the user in moving the platform assembly 20 from its unfolded to its folded position, and therefore can be of particular benefit to a user having limited strength or limited range of movement. The biasing device can be, for example, a gas cylinder 200 (see FIG. 13). (This type of device is sometimes referred to as a "gas spring".) The gas cylinder 200 comprises a body 202, and a piston (not shown) located within the body 202. The piston can translate within the body 202, in a direction coinciding with the longitudinal axis of the body 202.

The gas cylinder 200 is located with the lifting column 22, proximate a lower end thereof. The body 202 is pivotally coupled to the lifting column 22 by a suitable means such as a pin that extends through an eyelet 206 secured to the body 202. The rod 204 is pivotally coupled to a gusset 207. The gusset 205 is secured to the first cross member 30 by a suitable means such as welding. The rod 204 can be pivotally coupled to the gusset 205 by a pin that extends through an eyelet 208 secured to the rod 204.

The noted mounting arrangement for the gas cylinder 200 causes the rod 204 to be pushed into the body 202 by the gusset 205, when the platform assembly 20 is moved from its folded to its unfolded position. Rotation of the gusset 205 in relation to the lifting column 22 is facilitated by a cutout 209 formed in the lifting column 22 (see FIG. 12). The resulting movement of the piston compresses a gas located within a sealed volume between the piston and the body 202. The compressed gas exerts a reactive force on the piston and the body 202. The reactive force biases the piston downward. The downward bias of the piston, in turn, exerts a downward force on the gusset 205. The downward force produces a moment on the platform assembly 20 that acts in the clockwise direction (from the perspective of FIG. 6).

The moment generated by the gas cylinder 200 can reduce the amount of force that the user needs to exert on the platform assembly 20 to move the platform assembly 20 from its unfolded to its folded position. In other words, the gas cylinder 200 counterbalances the weight of the platform assembly 20. The gas cylinder 200 thereby reduces the amount of force that the user needs to apply to the platform assembly 20 to counteract the weight of the platform assembly 20. This feature can be particularly helpful to mobility-impaired individuals who often rely on personal transportation vehicles such as the scooter 12 or the wheelchair 14. Moreover, locating the gas cylinder 200 inside the lifting column 22 can reduce the potential for the gas cylinder 200 to be damaged or prematurely worn by exposure to the elements, road dust and dirt, accidental impacts, etc.

The gas cylinder 200 preferably exerts a biasing force of approximately 600 pounds on the platform assembly 20, when the platform assembly 20 is in its unfolded position. It should be noted that the optimal value for the biasing force is application dependent, and a specific value is specified herein for exemplary purposes only.

The mounting points of the gas cylinder 200 on the gusset 205 and the lifting column 22 preferably are chosen so that the moment exerted by the gas cylinder 200 on the platform assembly 20 becomes greater than the moment generated by the weight of the platform assembly 20 when the platform assembly 20 is rotated approximately sixty degrees from its unfolded position. (The moment generated by the weight of the platform assembly 20 varies as the platform assembly 20 pivots, because the distance between the center of gravity of the platform assembly 20 varies with the orientation of the platform assembly 20.) Hence, the gas cylinder 200 will rotate the platform assembly 20 into its folded position when the platform assembly 20 is tilted approximately sixty degrees or more. Moreover, the gas cylinder 200 will cause the platform assembly 20 to remain in its folded position until acted upon by an outside force sufficient to overcome the bias of the gas cylinder 200.

A bracket 218 can be secured to the actuator column 24 to further secure the platform assembly 20 in its folded position (the bracket is shown only in FIG. 6). The bracket 218 is configured to engage the second cross member 32 of the platform assembly when the platform is folded while in its upper position.

The platform assembly 20 preferably includes provisions that facilitate adjusting the orientation of the platform assembly 20 in relation to the lifting column 22. In particular, the first cross member 30 has two weld nuts 220 mounted thereon by a suitable means such as welding (see FIG. 17). The weld nuts 220 each receive a respective set screw 222.

The first cross member 30 has two holes 224 formed therein. The holes 224 each substantially align with a respective one of the weld nuts 220. The holes 224 permit the set screws 222 to be inserted into the first cross member 30, so that the set screws 222 can engage the weld nuts 220. Moreover, the holes 224 provide access to the set screws 222 after installation, so that the position of each set screw 222 in relation to the associated weld nut 220 can be adjusted.

Figure 17:
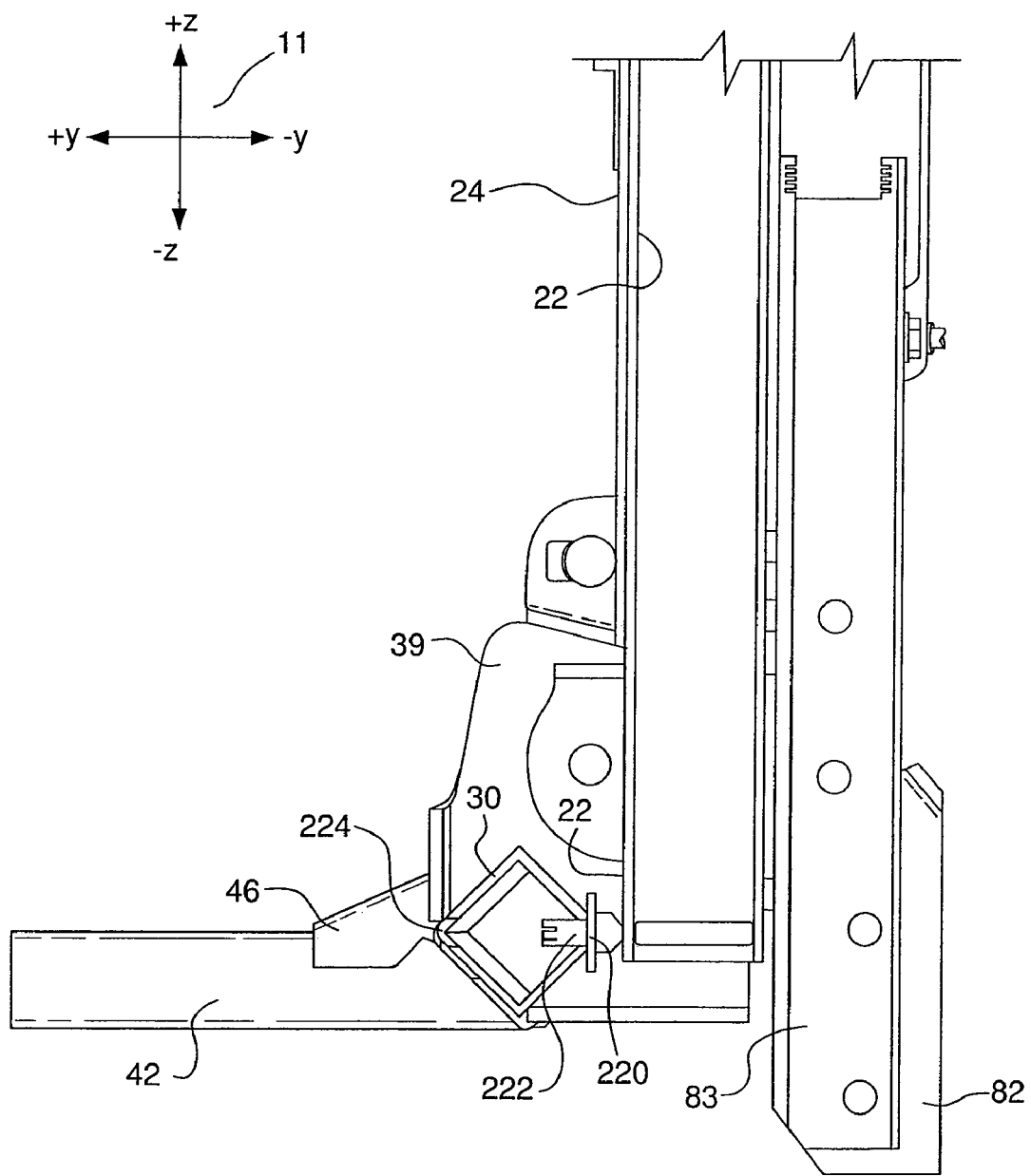
FIG. 17 is a cross-sectional view of the actuator column, the lifting column, the platform assembly, and the tongue weldment of the lift and carrier assembly shown in FIGS. 1-16, taken through the line "A-A" of FIG. 4.

The set screws 222 each extend rearward, i.e., in the "−y" direction, from their associated weld nut 220. An end of each set screw 222 contacts an outer surface of the lifting column 22 when the platform assembly 20 is in its unfolded position, as shown in FIG. 17. The set screws 222 prevent rotation of the platform assembly 20 past the unfolded position, and thereby acts as stops for the platform assembly 20.

The set screws 222 also permit the orientation of the platform assembly 20 to be adjusted. In particular, the set screws 222 can be advanced or retracted in relation to the weld nuts 220, to vary the distance by which the set screws 222 extend from the first cross member 30.

Varying the distance by which the set screws 222 extend from the first cross member 30 changes the stop point of the platform assembly 20. For example, retracting the set screws 222 into the first cross member 30 increases the distance by which the platform assembly 20 can rotate before the set screws 222 contact the lifting column 22. Conversely, extending the set screws 222 decreases the distance by which the platform assembly 20 can rotate before the set screws 222 contact the lifting column 22. Varying the stop point, in turn, changes the orientation of the platform assembly 20 in relation to the lifting column 22 when the platform assembly 20 is in its unfolded position. Hence, the orientation of the platform assembly 20 can be adjusted by the user with relative ease. This feature can be used, for example, to tailor the stop point of the platform assembly 20 so that the platform assembly 20 assumes a substantially level orientation when supporting a scooter 12 of a particular weight, and to compensate for manufacturing variations in the lift and carrier assembly 10.

The lift and carrier assembly 10 also includes a hold-down assembly 230 that helps to restrain the scooter 12 on the platform assembly 20 (see FIGS. 1-6 and 13-15A). The hold-down assembly 230 comprises a hold-down arm 232, a plurality of glides 234 mounted on the hold-down arm 232, and a hold-down arm plate 235. The hold-down arm plate 235 is secured to the hold-down arm 232 by a suitable means such as fasteners. Each glide 234 comprises a treaded shaft 238, and a cup 240 mounted on an end of the shaft 238.

The hold-down arm 232 has a plurality of holes 233 formed therein. The holes 233 are spaced apart along the length of the hold-down arm 232. Each hole 233 can accommodate the shaft 238 of one of the glides 234. In particular, the shaft 238 can inserted into a corresponding hole 233 at a desired location on the hold-down arm 232, so that the cup 240 is located below the hold-down arm 232. Nuts 242 threaded onto the shaft 238 above and below the hold-down arm 232 can be tightened against the hold-down arm 232, to secure the glide 234 to the hold-down arm 232.

Figure 12:
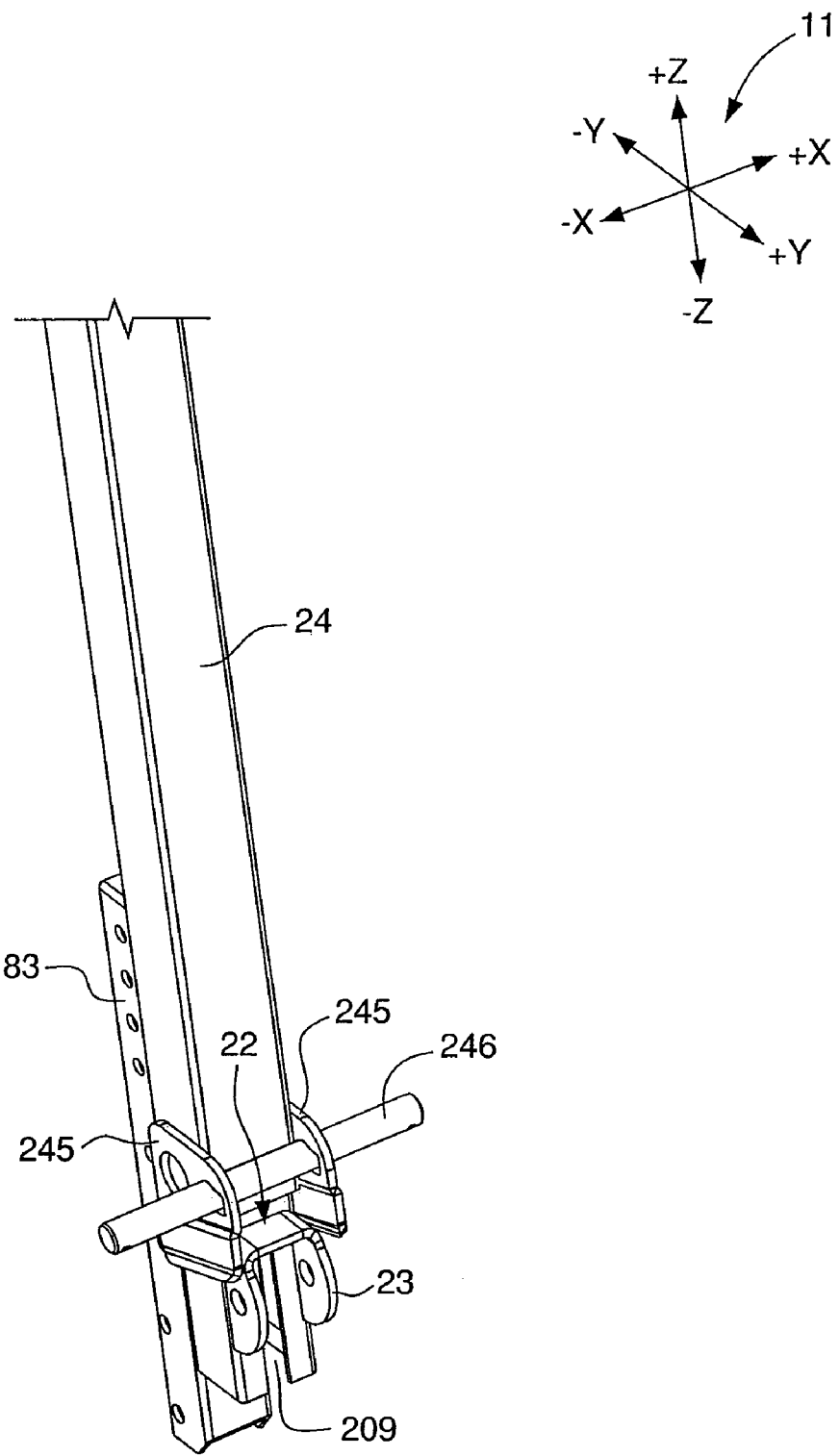
FIG. 12 is a front perspective view of the actuator column, the lifting column, and a vertical tongue of the lift and carrier assembly shown in FIGS. 1-11.
Figure 13:
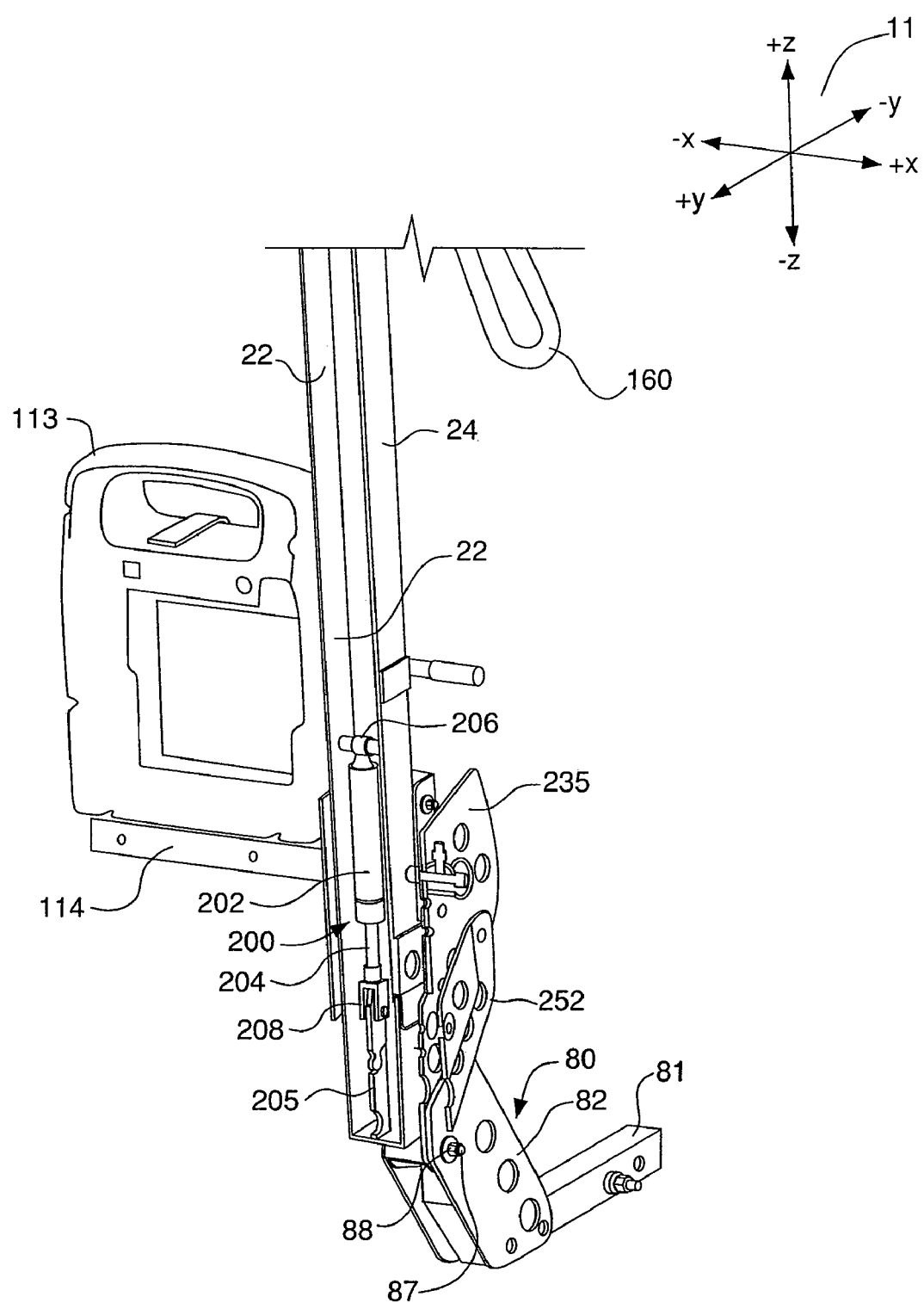
FIG. 13 is a cross-sectional view of the actuator column, the lifting column, and a tongue weldment of the lift and carrier assembly shown in FIGS. 1-12, taken through the line "B-B" of FIG. 4.

The hold-down assembly 230 also includes guide ears 245 (see FIGS. 12 and 15A). The guide ears 245 are secured to the actuator column 24 by a suitable means such as welding. The hold-down arm plate 235 is pivotally coupled to the guide ears 245 by a pivot 246. The hold-down arm plate 235, and the attached arm hold-down arm 232, can pivot between a first, or deployed position, shown in FIGS. 4-6, and a second, or stored position, shown in FIGS. 1-3. The hold-down assembly 230 includes a stop 266 mounted on the actuator column 24 to restrain the hold-down arm 232 from moving past its stored position. The hold-down arm 232 helps to restrain the scooter 12 on the platform assembly 20 when the hold-down arm 232 is in its deployed position (see FIGS. 3 and 5).

The hold-down assembly 230 also includes a spring 248 disposed around the pivot 246 (see FIG. 15). The spring 248 biases the hold-down arm plate 235 and the hold-down arm 232 in the clockwise direction (from the perspective of FIG. 15A), toward the stored position.

The hold-down arm 232, as discussed below, is held in the deployed position, against the bias of the spring 248, when the platform assembly 20 is in its unfolded folded position. The vertical ("z" axis) position of each glide 234 can be adjusted so that the associated cup 240 contacts the floorboard of the scooter 12 when the scooter 12 is positioned on the platform assembly 20, and the platform assembly 20 is raised to the upper position (see FIG. 4). This adjustment can be performed by positioning each glide 234 at the desired position in relation to the hold-down arm 232, and tightening the nuts 242. The cups 240 preferably are formed from a relatively soft, resilient material such as natural or synthetic rubber, so that the cups 240 can contact the floorboard of the scooter 12 without scratching or otherwise damaging the scooter 12. Moreover, the use of multiple holes 233 spaced apart along the length of the hold-down arm 232 permits the lateral ("y" direction) position of each glide 234 to be tailored to a particular type of scooter 12.

The above-noted mounting arrangement for the glides 234 thus can permit the user to configure the hold-down arm assembly 230 to accommodate a particular type of scooter 12. Moreover, the ability to adjust both the vertical and lateral positions of the glides 234 can potentially maximize the effectiveness of the hold-down arm assembly 230 at restraining the scooter on the platform assembly 20.

It should be noted that the optimal number of glides 234 for a particular application can vary with factors such as the size and geometry of the scooter 12. More or less than the number of glides 234 depicted in the figures can be used in other applications.

The hold-down assembly 230 also includes a cam follower 250, a cam follower plate 252, and a cam follower shaft 254. These components cause the hold-down arm 232 to pivot from its stored to its deployed position when the platform assembly 20 is raised to moved to its upper, unfolded (the hold-down arm 232 normally resides in its stored position when the platform assembly 20 is not in the upper position).

The cam follower plate 252 has a substantially square mounting portion 252a (see FIG. 5). The mounting portion 252a is sized to fit around the first cross member 30 of the platform assembly 20, and is secured to the first cross member 30 by a suitable means such as a weld nut and a set screw.

The cam follower shaft 254 is mounted on the cam follower plate 252 by a suitable means such as e-clips. The cam follower 250 is mounted on the cam follower shaft 254 so that the cam follower 250 can rotate in relation to the cam follower shaft 254 and the cam follower plate 252 (see FIGS. 14A-15A).

Figure 14A:
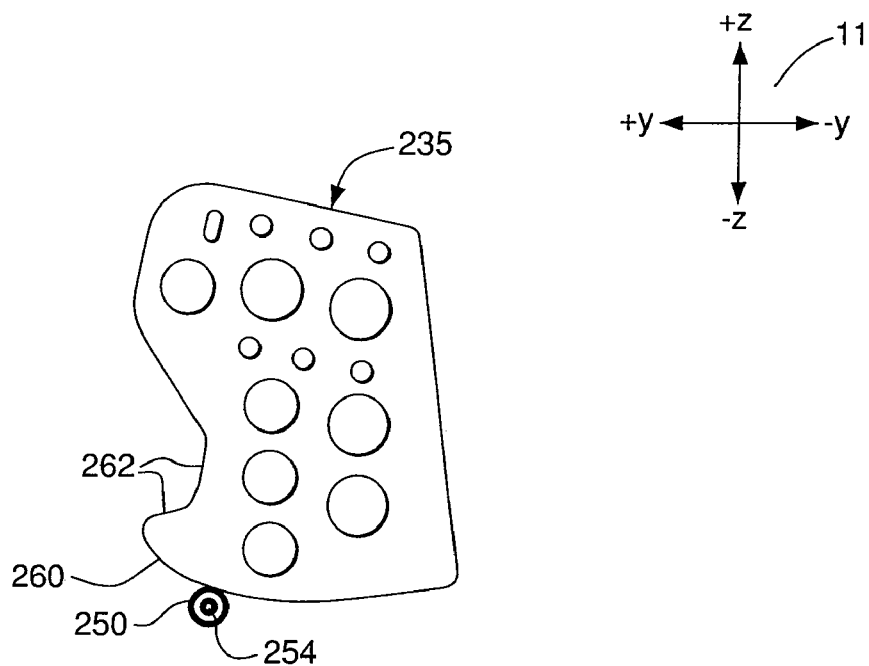
FIG. 14A is a side view of a hold-down arm plate and a cam follower of the lift and carrier assembly shown in FIGS. 1-13, depicting initial contact between the hold-down arm plate and the cam follower.

Movement of the platform assembly 20 from the lower to the upper position, while the platform assembly 20 is in it is unfolded position (and the hold-down arm 232 is therefore in its stored position) causes the cam follower 250 to contact a surface portion 260 of the hold-down arm plate 235 (see FIG. 14A). Upon contact of the cam follower 250 and the surface portion 260, an upward force, resulting from the upward movement of the platform assembly 20, is transmitted to the cam follower 250 by way of the cam follower plate 252 and the cam follower shaft 254.

The surface portion 260 of the cam follower plate 252 has a curved profile that causes the cam follower 250 to ride along the surface portion 260, and to exert a torque on the hold-down arm plate 235 in the counterclockwise direction (from the perspective of FIG. 14A), as the platform assembly 20 continues to move upward. This torque causes the hold-down arm plate 235, and the attached hold-down arm 232, to rotate in the counterclockwise direction.

The surface portion 260 adjoins another surface portion 262 of the cam follower plate 252. The surface portions 260, 262 help to define a hook-shaped portion 264 of the cam follower plate 252. Continued movement of the platform assembly 20 and the attached cam follower plate 252 in the upward direction causes cam follower 250 to ride over the hook-shaped portion 264 and onto the surface portion 262, to the position depicted in FIG. 14B. The hold-down arm 232 at this point has reached its deployed position. The contact between the surface portion 262 and the cam follower 250 counteracts the bias of the spring 248, and causes the hold-down arm 232 to remain in its deployed positions.

Figure 14B:
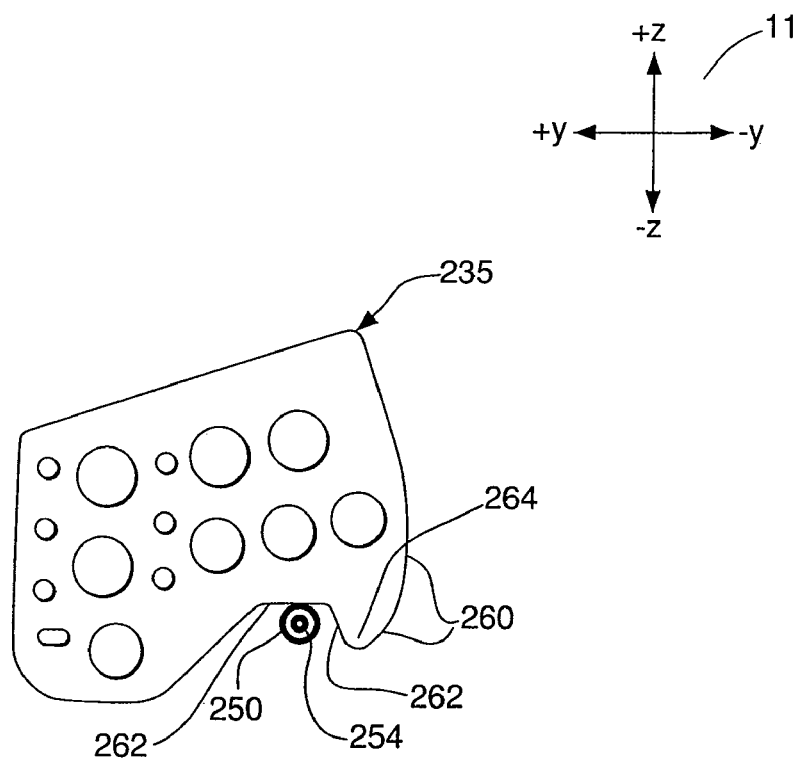
FIG. 14B is a side view of the hold-down arm plate and the cam follower of the lift and carrier assembly shown in FIGS. 1-14B, after the hold-down arm plate has been rotated by the cam follower.

The hook-shaped portion 264 of the hold-down arm plate 235 helps to retain the hold-down arm plate 235 in the position depicted in FIG. 14B. This feature can be particularly useful when the lift and carrier assembly 10 and the scooter 12 are bumped, jarred, or bounced during transport, e.g., when the transporting vehicle 15 rides over bumps or pot-holes in the road.

Bumping, jarring, or bouncing of the scooter 12 and the platform assembly 20 can cause the platform assembly 20 to pivot toward its folded position. This motion can potentially eliminate the contact between the cam follower 250 and the hold-down arm plate 235 that retains the hold-down arm 232 in the deployed position. The hook-shaped portion 264 can prevent separation of cam follower 250 and the hold-down arm plate 235 when the scooter 12 and the platform assembly 20 are bounced. In particular, rotation of the hold-down arm plate 235 in the clockwise direction under such circumstances causes the cam follower 250 to contact the hook-shaped portion 264. The geometry of the hook-shaped portion 264 traps the cam follower 250, thereby preventing further rotation of the hold-down arm plate 235 in the clockwise direction (and preventing the hold-down arm 232 from backing away from its deployed position). This feature can thus reduce the potential for the scooter 12 to fall off the platform 20 when the transporting vehicle 15 rides over bumps, pot-holes, etc.

Lowering the platform assembly 20 from its upper position, while the hold-down arm 232 is in its deployed position, causes the cam follower 250 to back away from the hold-down arm plate 235. The hold-down arm plate 235, upon being released from the restraint of the cam follower 250, rotates in the clockwise direction, thereby causing the hold-down arm 232 to return to its stored position.

Raising the platform assembly 20 while the platform assembly 20 is in its folded position does not result in contact between the cam follower 250 and the hold-down arm plate 235, due to the orientation of the cam follower plate 252. Hence, the hold-down arm 232 remains in its stored position under these circumstances.

The lift and carrier assembly 10 can be mounted on the transporting vehicle 15 using a swing-away adapter 300 (see FIGS. 1, 3, and 18A-18C). The swing away adapter 300 comprises a first arm 302, and a second arm 303. The swing away adapter 300 also comprises a bracket 305 secured to the second arm 303, proximate a first end thereof, by a suitable means such as welding.

An end of the first arm 302 is coupled to the bracket 305 by a pin 306. This arrangement permits the first arm 302 to pivot in relation to the second arm 304, about an axis passing substantially through the pin 306. The first arm 302 can pivot between a stored position shown in FIGS. 18A and 18C, and a vehicle-loading position shown in FIG. 18B. The pivoting motion of the first arm 302 moves the lift and carrier assembly 10 toward or away from the transporting vehicle 15. This feature can be used to provide access to the transporting vehicle 15.

The first arm 302 is secured to a gusset 307 by a suitable means such as welding. A tongue bar 308 is secured to the second arm 303, proximate a second end thereof, by a suitable means such as welding. The gusset 307 and the tongue bar 308 can be used in lieu of the above-described gusset 82 and tongue bar 81, respectively.

The swing away adapter 300 also comprises a locking arm 309. An end of the locking arm 309 is located within the first arm 302, and is pivotally coupled to the first arm 302 by a pin. The locking arm 309 is biased toward a lower position, shown in the figures, by a spring (not shown) located with in the first arm 302.

The swing away adapter 300 further includes a first bracket 310 and a second bracket 311 each secured to the second arm 303 by a suitable means such as welding. The first and second brackets 310, 311 are positioned on opposite sides of the gusset 307.

Figure 18A:
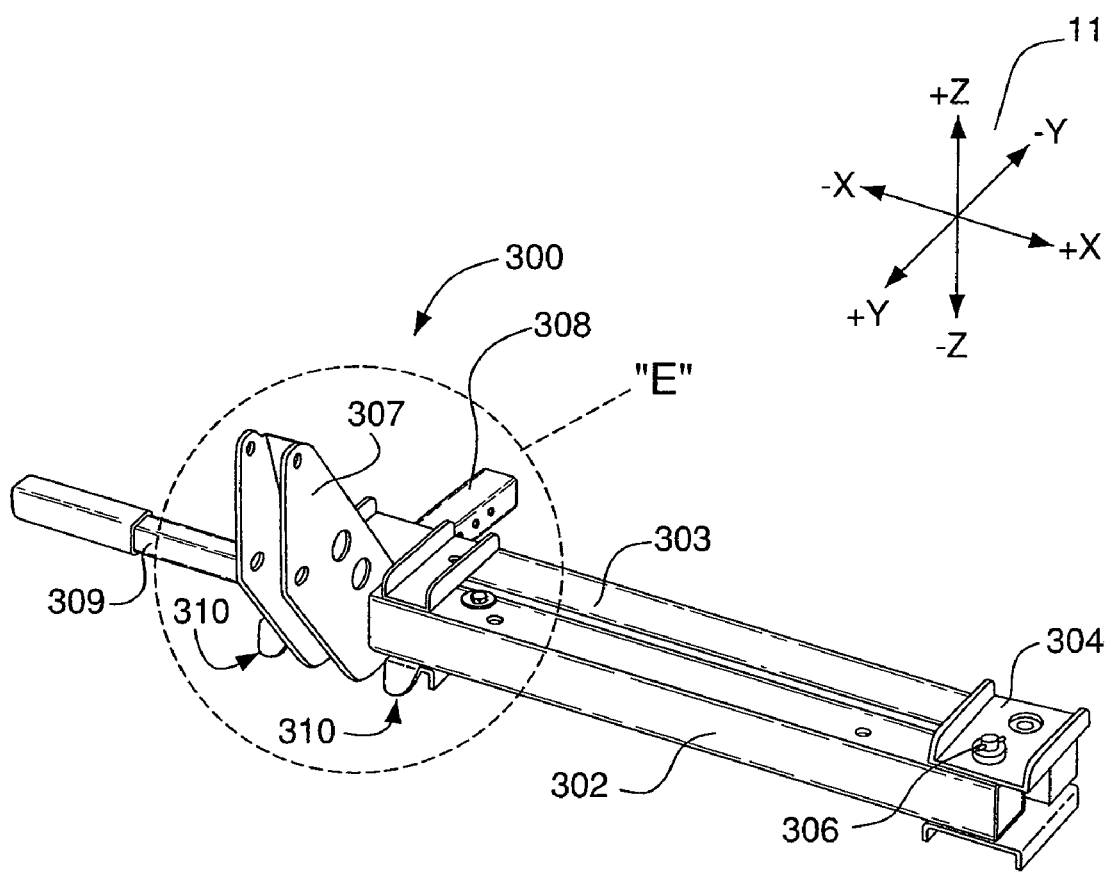
FIG. 18A is a perspective view of a swing-away adapter capable of being used with the lift and carrier assembly shown in FIGS. 1-17, showing a first arm of the swing-away adapter in a stored position.
Figure 18B:
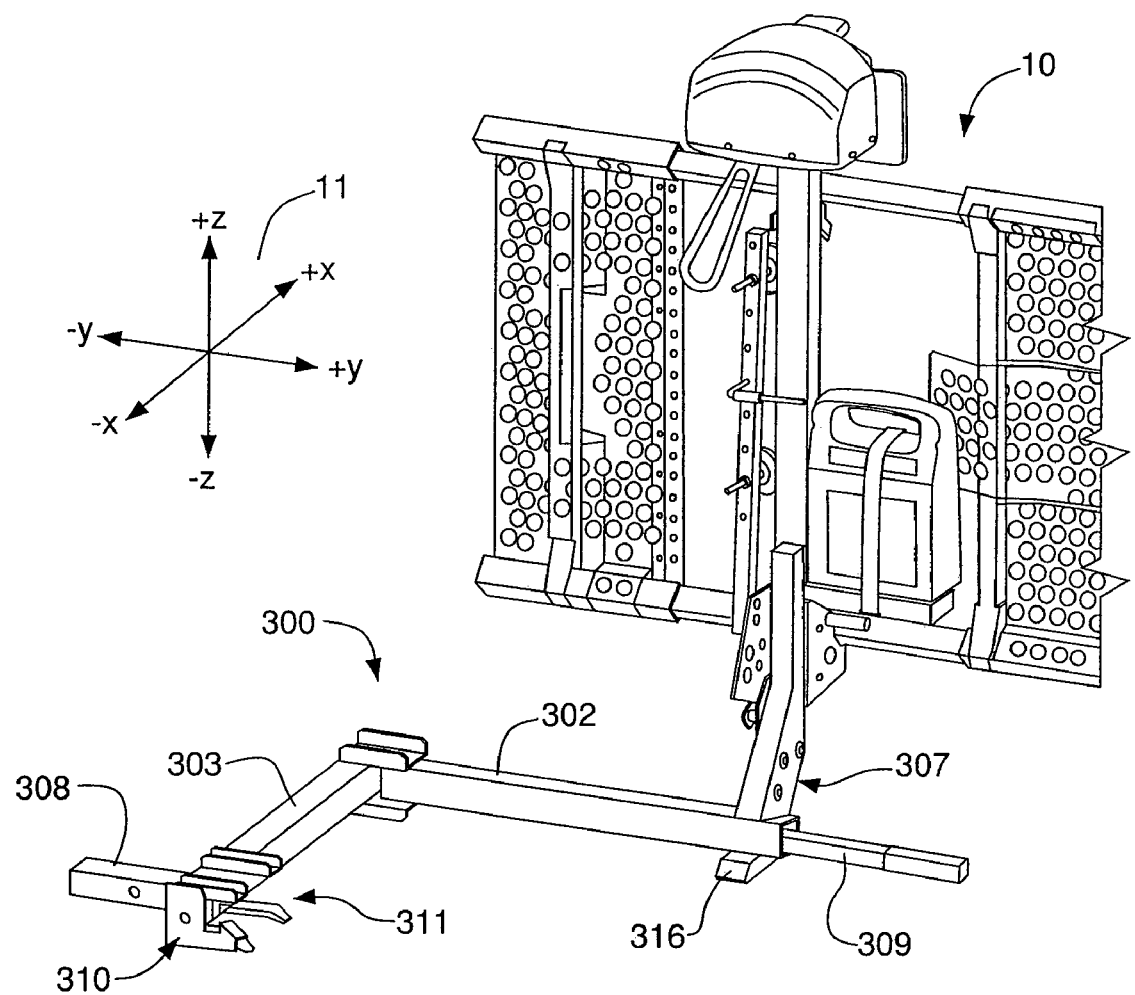
FIG. 18B is a perspective view of the swing-away adapter and the lift and carrier assembly shown in FIGS. 1-18A, showing an arm of the swing-away adapter in a stored position.
Figure 18C:
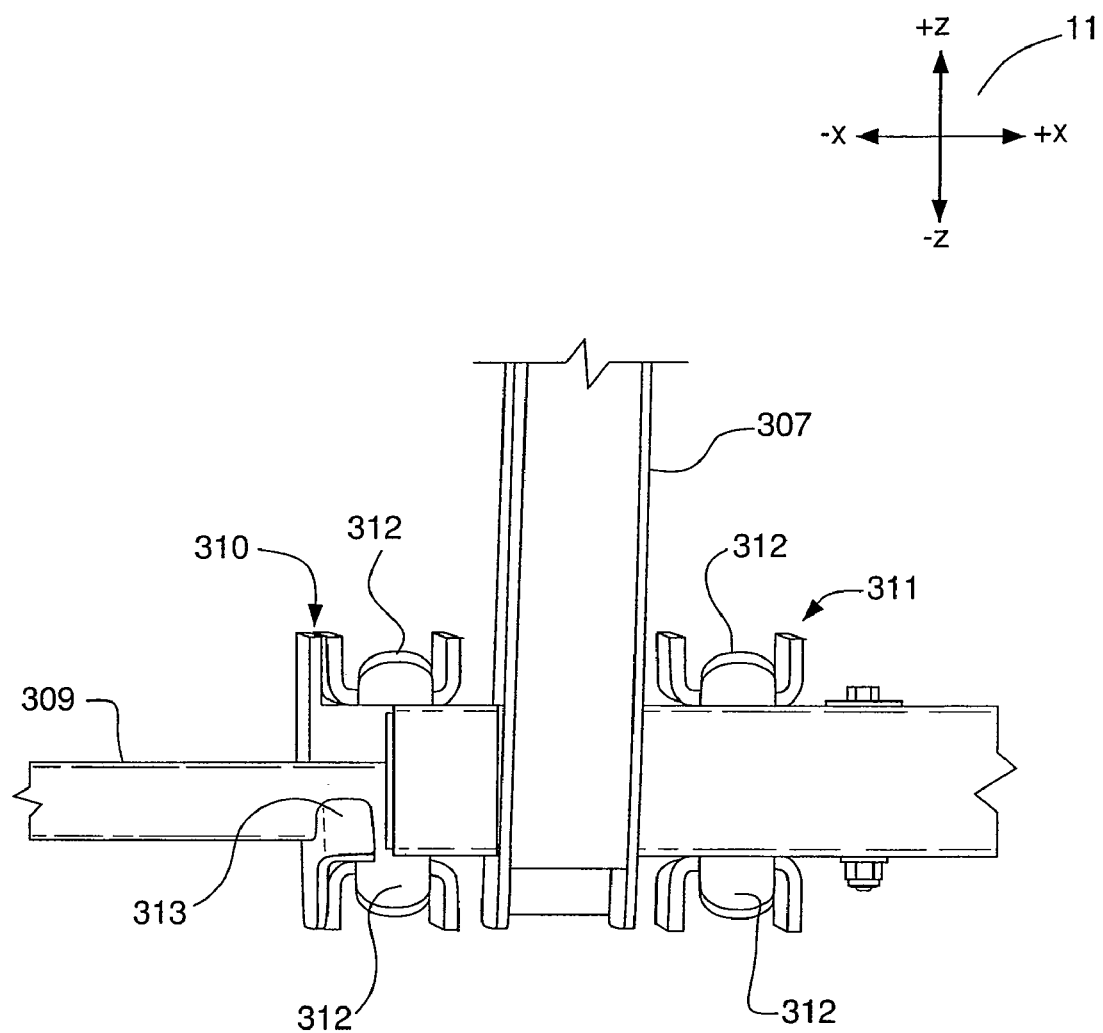
FIG. 18C is a magnified view of the area designated "E" in FIG. 18A.

The first arm 302 engages the first and second brackets 310, 311 as shown in FIGS. 18A and 18C when the first arm 302 is in the stored position, so that the first and second brackets 310 help to support the first arm 302. The first and second brackets 310, 311 each include ramp portions 312 that help guide the first arm 302 into the first and second brackets 310, 311 as the first arm 302 is moved to its stored position.

The first bracket 310 includes a ramp portion 313 that interferes with movement of the locking arm 309 away from the second arm 303 when the locking arm 309 is in its lower position. This feature helps to lock the first arm 302 in place, and thereby minimizes the potential for unintentional movement of the first arm 302 (and the lift and carrier assembly 10) from the stored position. The first arm 302 can be moved to the vehicle-loading position by lifting the locking arm 309 so that the locking arm 309 clears the ramp portion 313.

The gusset 307 includes a ramp portion 316 that contacts the second arm 303 when the first arm 302 is in the stored position, thereby providing torsional stability to the first arm 302 and the gusset 307.

Figure 18D:
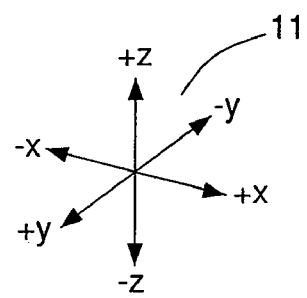
FIGS. 18D and 18E are perspective views of an alternative embodiment of the swing-away adapter shown in FIGS. 18A-18C.
Figure 18D:
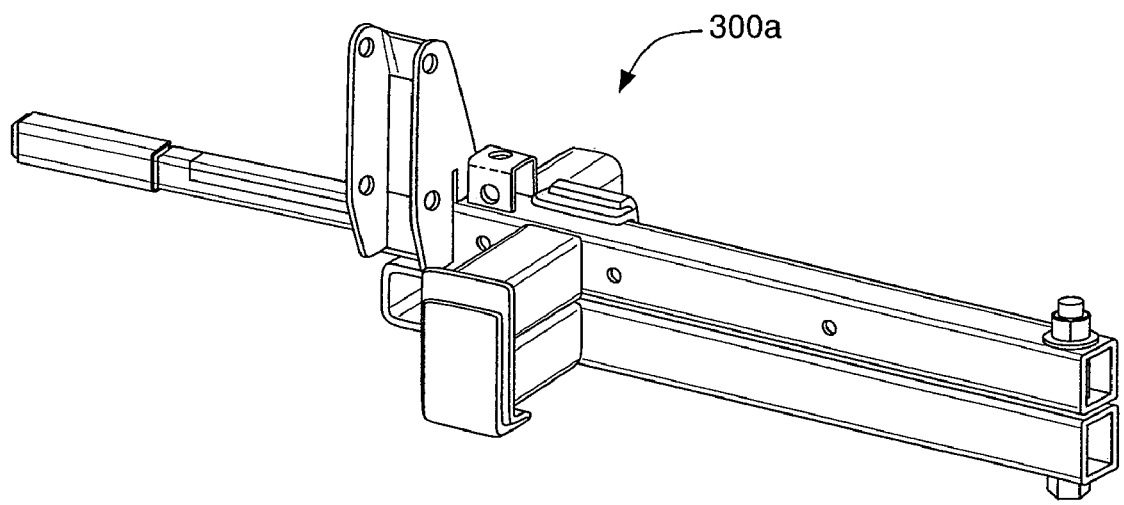
Figure 18E:
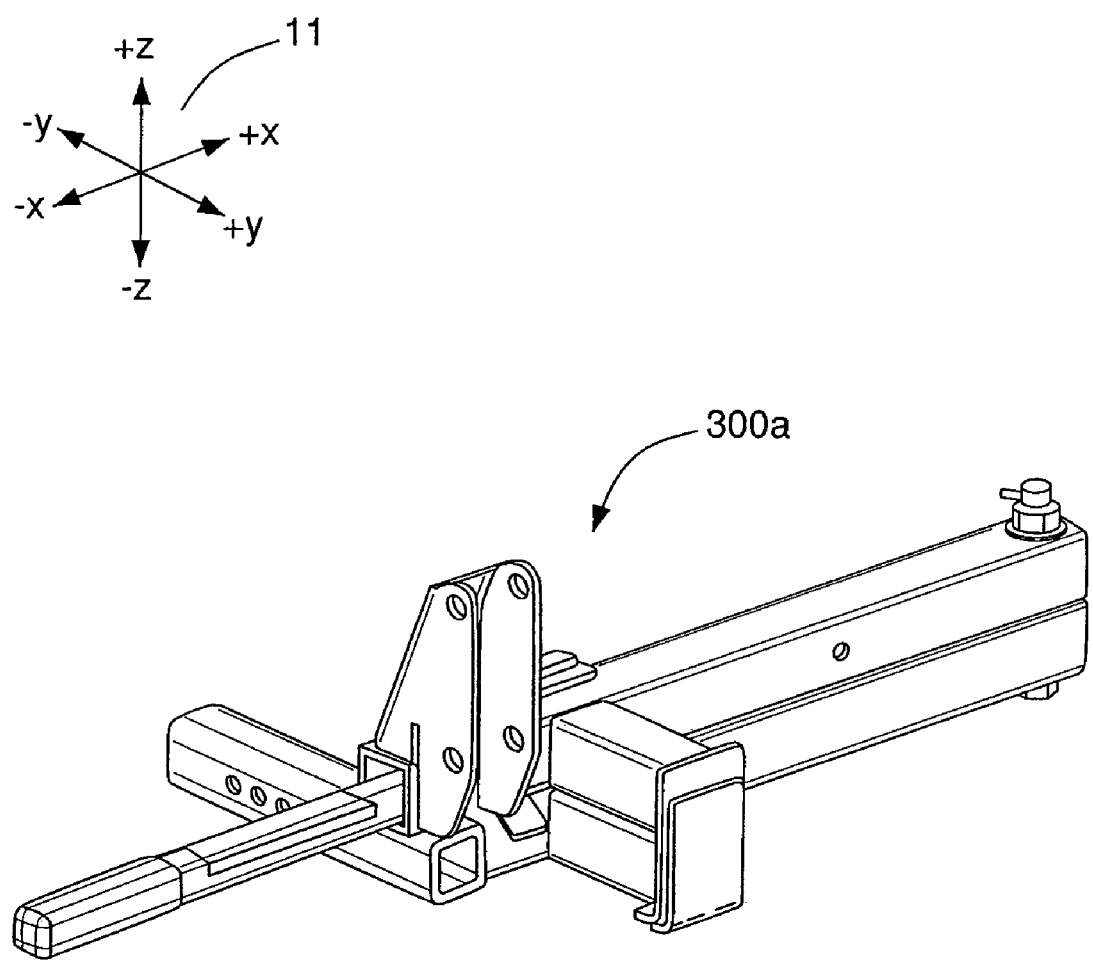
Figure 18F:
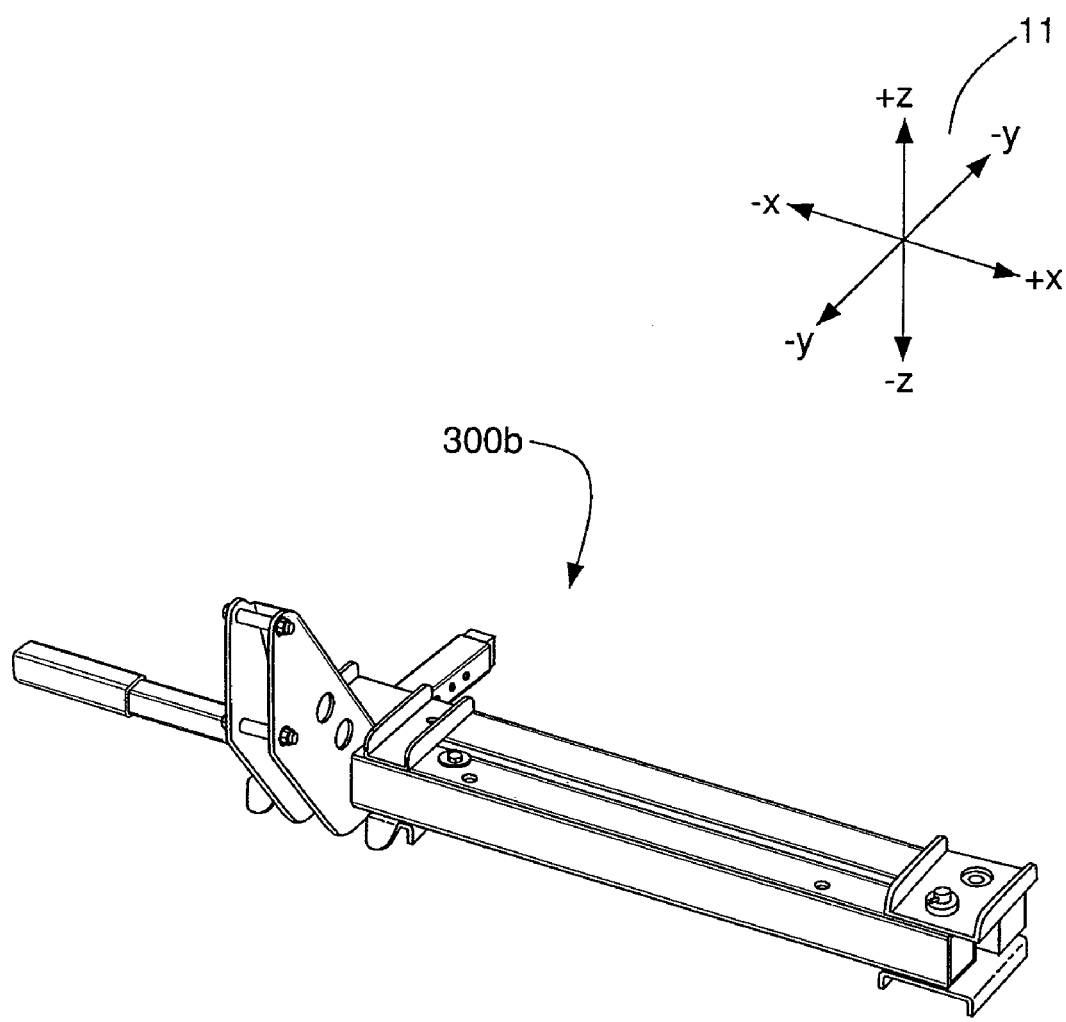
FIGS. 18F and 18G are perspective views of another alternative embodiment of the swing-away adapter shown in FIGS. 18A-18C.
Figure 18G:
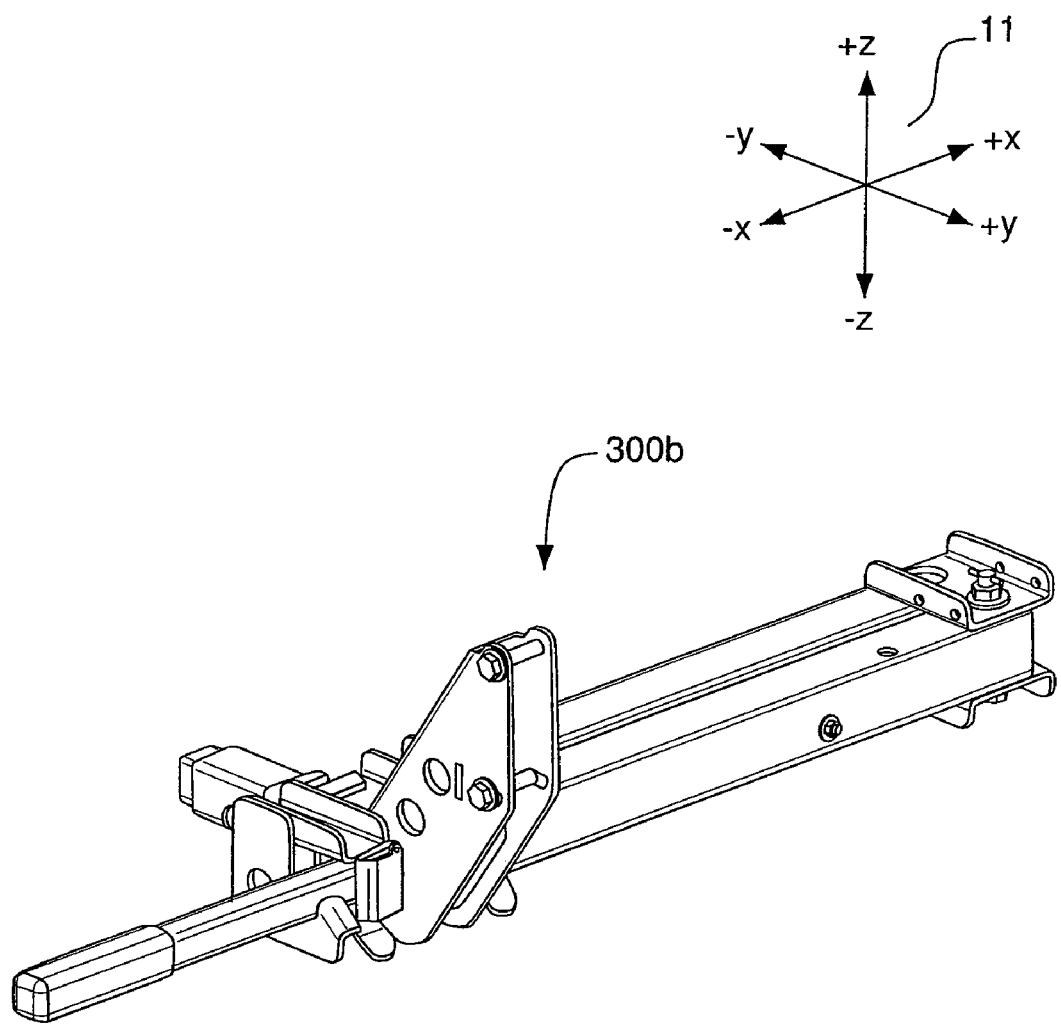

An alternative embodiment of the swing away adapter 300 in the form of a swing away adapter 300a is depicted in FIGS. 18D and 18E. Another alternative embodiment of the swing away adapter 300 in the form of a swing away adapter 300b is depicted in FIGS. 18F and 18G.

The lift and carrier assembly 10 can be equipped with a platform assembly 330 in lieu of the platform assembly 20, to facilitate use of the lift and carrier assembly 10 with the wheelchair 14. (The lift and carrier assembly, as configured in this manner, is designated with the reference character "10a" in FIGS. 19-21.) The platform assembly 330 comprises a cross member 332, and a platform weldment 333 mounted on the cross member 332. The platform assembly 330 also comprises rail member 334 secured to the cross member 332 and the platform weldment 333.

The platform assembly 330 further includes a gusset 335 secured to the cross member 332, for pivotally coupling the platform assembly 330 to the lifting column 22. The platform assembly 330 can be pivoted between an unfolded position shown in FIGS. 19 and 20, and a folded position shown in FIG. 21.

The platform weldment 333 comprises a platform 336, a first transverse support 337, and second transverse support 338. The first and second transverse supports 337, 338 are secured to the platform 336 and the cross member 332 by a suitable means such as welding.

The rail member 334 comprises a front portion 334a, a side portion 334b adjoining the front portion 334a, and a rear portion 334c adjoining the side portion 334b. An end of the front portion 334a is secured to the second transverse support 338 and the cross member 332 by a suitable means such was welding. An end of the rear portion 334c is secured to the cross member 332 by a suitable means such was welding.

The wheelchair 14 preferably is pushed onto the platform assembly 330 while the wheelchair 14 is in a folded configuration, as shown in FIG. 19. The front wheels of the wheelchair 14 are accommodated by the platform 336 of the platform weldment 333. The rail member 334 is sized to cradle the rear wheels of the wheelchair 14, as depicted in FIG. 19, when the platform assembly 330 is raised. The side portion 334b of the rail member 334 preferably is angled upward towards the center thereof, as shown in FIGS. 19 and 20, so that the side portion 334b can restrain the rear wheels from substantial lateral movement.

The platform assembly 330 and the platform assembly 20 can be removed and installed without minimal effort, and without specialized tooling. Hence, the lift and carrier assembly 10 can be reconfigured with relative ease to carry the scooter 12 or the wheelchair 14.

The lift and carrier assembly 10a can be equipped with a hold-down arm assembly 340 for restraining the wheelchair 14 on the platform assembly 330. The hold-down arm assembly 340 comprises a substantially U-shaped hold-down arm 341, and pads 342 positioned over the hold-down arm 341. Ends of the hold-down arm 341 are pivotally coupled to a bracket 343 secured to the actuator column 24, so that the hold-down arm 341 can pivot between a deployed position shown in FIGS. 919 and 20, and a stored position shown in FIG. 21. The vertical position of the bracket 343 on the actuator column 24 can be varied to accommodate wheelchairs of different heights.

A cross brace 344 is secured to the hold-down arm 341, proximate the ends thereof. Interference between the cross brace 344 and the actuator column 24 prevent the hold-down arm 341 from pivoting above its deployed position, and thereby helps to secure the wheelchair 14 on the platform assembly 330. A brace 345 is secured to the hold-down arm 341, proximate the outboard portion thereof, to help restrain the wheelchair 331 in the lateral direction.

Figure 22:
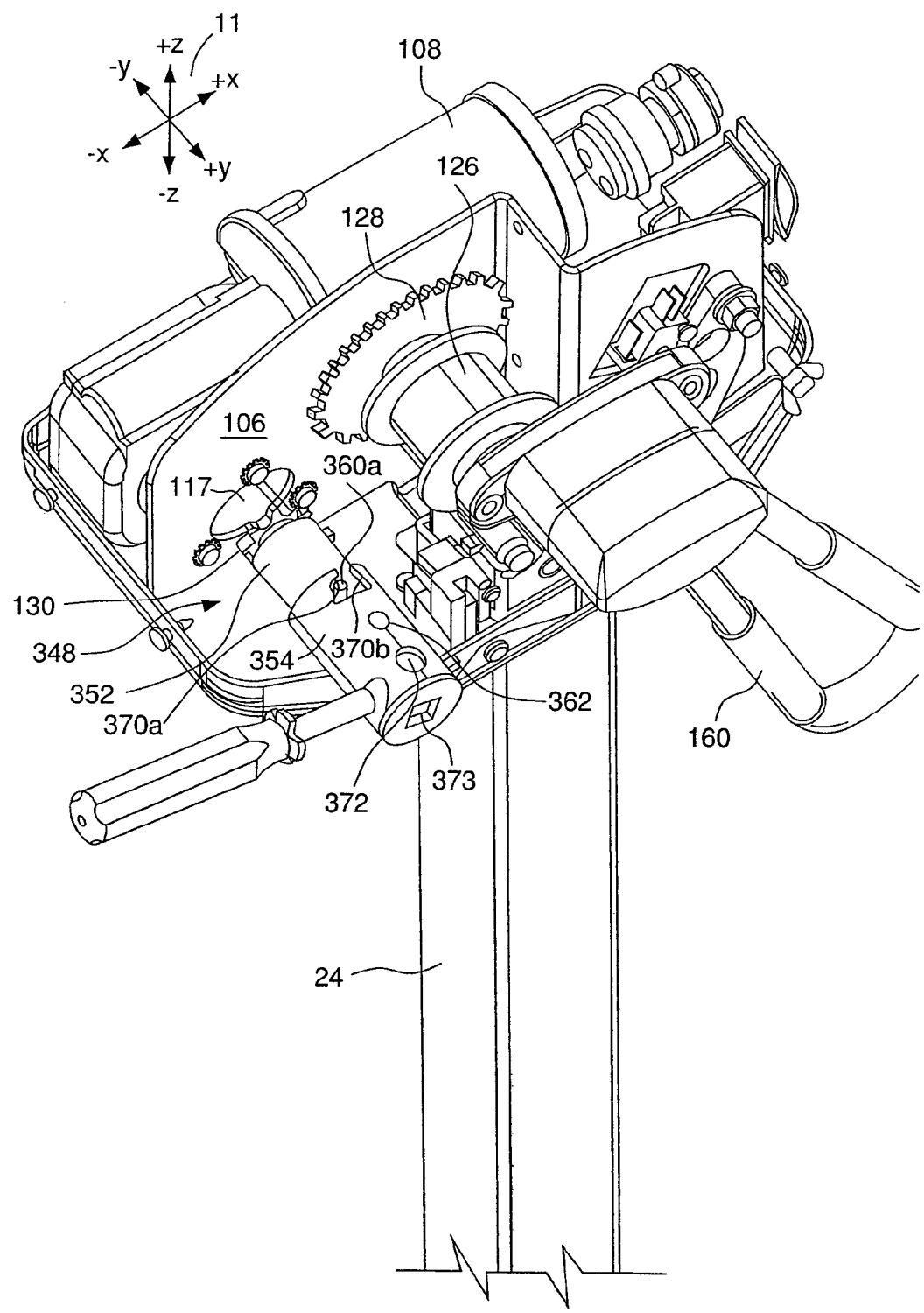
FIG. 22 is a perspective view of an alternative embodiment of the power head of the lift and carrier assembly shown in FIGS. 1-17 and 18B, the power head having a manual cranking mechanism, with a cover and a front bracket of the power head removed.
Figure 23:
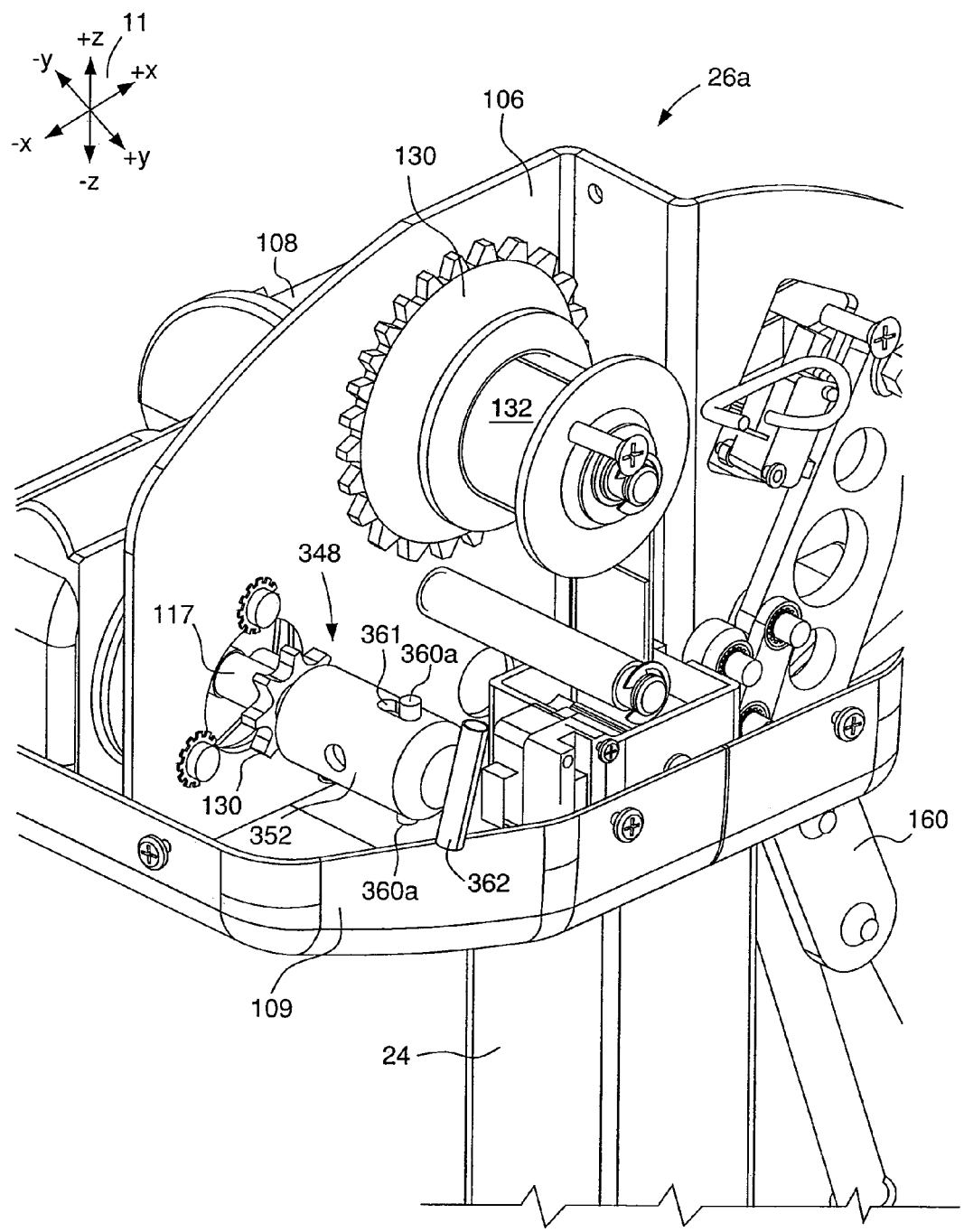
FIG. 23 is a perspective view of the power head shown in FIG. 22, without a ratchet crank socket of the manual cranking mechanism.
Figure 24:
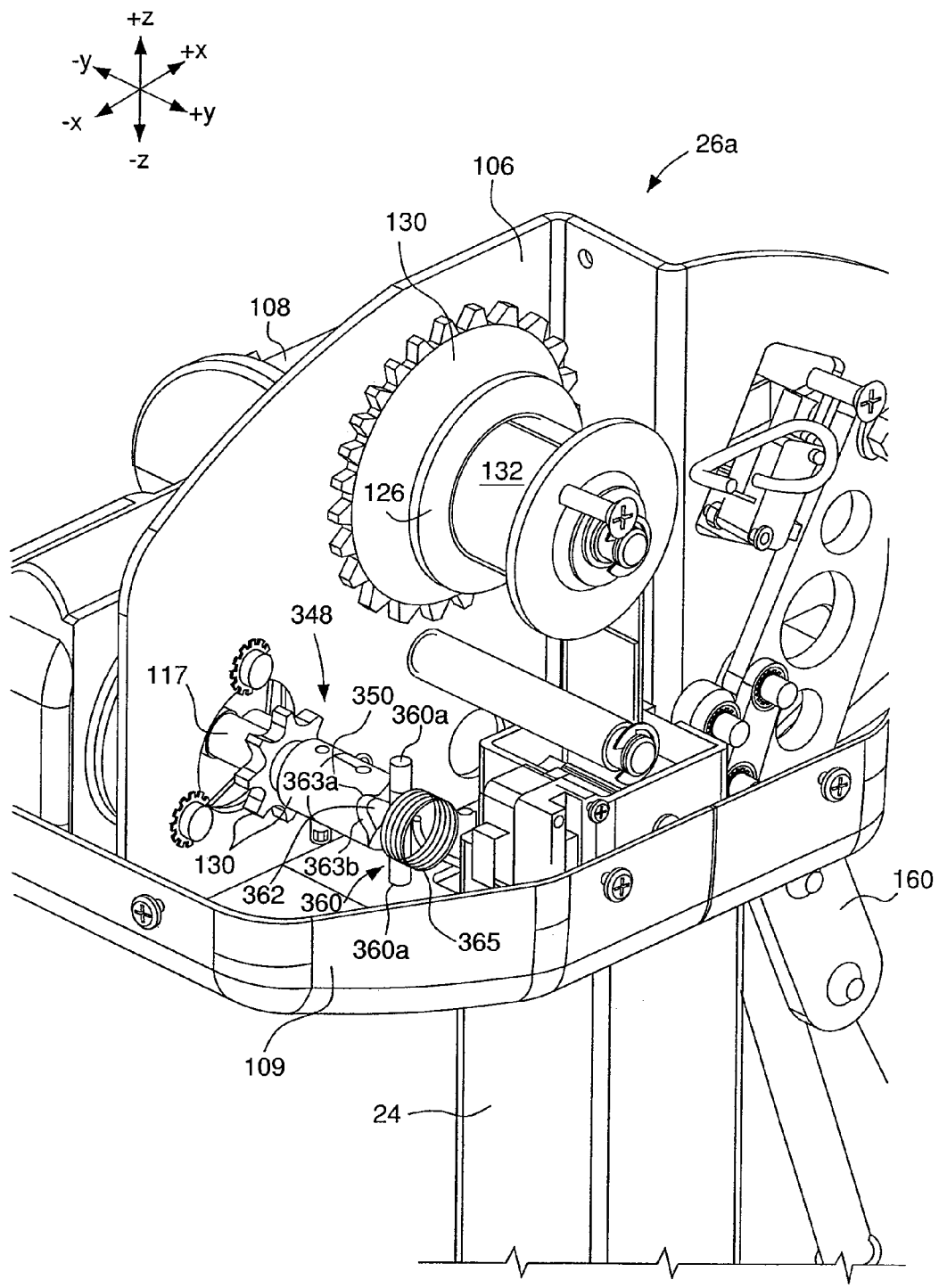
FIG. 24 is a perspective view of the power head shown in FIGS. 22 and 23, without the ratchet crank socket and a sprocket collar of the manual cranking mechanism.

FIGS. 22-24 depict an alternative embodiment of the power head 26. In particular, FIGS. 22-24 show a power head 26a having a manual cranking mechanism 348 that permits the platform assembly 20 to be raised and lowered manually. The manual cranking mechanism 348 can be used, for example, when electrical power is not available to energize the motor 108, or in other situations where the motor 108 cannot be utilized to raise or lower the platform assembly 20.

The power head 26a is substantially similar to the power head 26, with the exception of the manual cranking mechanism 348. Identical reference characters are used in the figures to refer to substantially identical components of the power head 26 and the power head 26a.

The manual cranking mechanism 348 comprises a ratchet ring 350, a sprocket collar 352, and a ratchet crank socket 354. The ratchet crank socket 354 is removed in FIGS. 22 and 23, and the sprocket collar 352 is removed in FIG. 23, to reveal the underlying components of the manual cranking mechanism 348.

The ratchet ring 350 is secured to the output shaft 117 of the motor 108 by a suitable means such as set screws. This arrangement causes the ratchet ring 350 to rotate with the motor shaft 117. The sprocket collar 352 is positioned over the ratchet ring 350, and over a portion of the second sprocket 130 (see FIG. 23). The sprocket collar 352 is secured to the second sprocket 350 by a suitable means such as set screws. The sprocket collar 352 is not secured to the ratchet ring 350, or to the output shaft 117. The second sprocket 130 is coaxially disposed over the output shaft 117, but is not secured the output shaft 117. The second sprocket 130 therefore can rotate in relation to the output shaft 117 (unlike in the power head 26).

The manual cranking mechanism 348 also comprises a first pin 360. The first pin 360 extends through the sprocket collar 352, so that ends 360a of the first pin 360 project from the sprocket collar 352 (see FIG. 23).

The sprocket collar 352 has diametrically opposed slots 361 formed therein for accommodating the first pin 360. The ends 360a each have a diameter greater that a width of the associated slot 361, so interference between the ends 360a and the sprocket collar 352 retains the first pin 360 on the sprocket collar 352. The slots 361 allow the first pin 360 to translate linearly, toward and away from the ratchet ring 350.

An end of the ratchet ring 350 has four cutouts 362 formed around a circumference thereof (see FIG. 24). The cutouts 362 are arranged as two diametrically-opposed pairs. The cutouts 362 receive the first pin 360. A spring 365 is positioned within the sprocket collar 352. The spring 365 is compressed between an end of the sprocket collar 352, and the first pin 360. The spring 365 biases the first pin 360 toward the ratchet ring 350, and urges the first pin 360 into a diametrically-opposed pair of the cutouts 362.

Each cutout 362 is defined by a first surface portion 363a and a second surface portion 363b of the ratchet ring 350. The first surface portion 363a is oriented substantially in the axial direction, i.e., in a direction coinciding substantially with the axis of rotation of the ratchet ring 350. This feature facilitates the transfer of torque from the ratchet ring 350 to the first pin 360 when the ratchet ring 350 rotates in the counterclockwise direction (from the perspective of FIG. 24). More particularly, the first surface portion 363a engages the first pin 360 when the first pin 360 is positioned in the associated cutout 362. Torque from the motor 108 is transferred to the output shaft 117 and the ratchet ring 350. The noted orientation of the surface portion 363a causes the surface portion 363a to act against the first pin 360 when the motor 108 is activated in the first direction. This contact facilitates transfer of the torque generated by the motor 108 to the first pin 360.

The torque is transferred from the first pin 360 to the sprocket collar 352 by contact between the ends 360a of the first pin 360, and the periphery of the slots 361 formed in the sprocket collar 352. The sprocket collar 352 transfers the torque to the second sprocket 130, causing the second sprocket 130 to rotate in the counterclockwise direction. Rotation of the second sprocket 130 in the counterclockwise direction, as discussed above, raises the platform assembly 20.

The noted contact between the first surface portion 363a and the first pin 360 also restrains the second sprocket 130 from clockwise rotation when the motor 108 is not activated. In particular, the weight of the platform assembly 20, the lifting column 22, and the scooter 12 (when positioned on the platform assembly 20) cause the strap 132 to exert a torque on the second sprocket 130 in the clockwise direction. This torque is transferred to the first pin 360 by way of the sprocket collar 352. The ratchet ring 350 reacts the torque by way of the surface portions 363a, thereby retraining the sprocket collar 352 and the attached second sprocket 130.

The ratchet crank socket 354 is positioned over the sprocket collar 352 during use of the manual cranking mechanism 348. The ratchet crank 354 is not secured to the sprocket collar 352, and can be stored by the user at a convenient location, e.g., in the glove box of the transporting vehicle 15, when the manual cranking mechanism 348 is not being used.

The ratchet crank socket 354 can be accessed by the ratchet crank socket 354 via through holes formed in the cover 109 and the front bracket 104. The through hole in the cover 109 is located beneath the license plate bracket 110. The through hole can be covered with a plug or other suitable means for discouraging potential contaminants such as road dust, dirt, rain, etc., from entering the power head 26a when the manual cranking mechanism 348 is not in use.

A second pin 362 is secured to the ratchet crank socket 354 (see FIGS. 23 and 24). Ends of the second pin 362 are accommodated in diametrically opposed through holes formed in the ratchet crank socket 354, so that the second pin extends through the ratchet crank socket 354. Interference between the second pin 362 and an end of the ratchet crank socket 354 limits the extent to which the ratchet crank socket 354 can be inserted into the power head 26a.

The ratchet crank socket 354 has two diametrically-opposed cutouts 366 formed therein for accommodating ends of the first pin 360 when the ratchet crank socket 354 is placed over the ratchet crank socket 354.

The manual cranking mechanism 348 can be used to raise or lower the platform 20, as follows. The license plate holder 110 can be raised using the hinges 112, to provide access to the hole in the cover 109 that accommodates the ratchet crank socket 354. After removing the plug, the user can insert the ratchet crank socket 354 into the power head 26a by way of the through holes formed in the cover 109 and the front bracket 104, until the ratchet crank socket 354 contacts the first pin 360. If necessary, the ratchet crank socket 354 can be rotated to align the cutouts 366 with the first pin 360, and the ratchet crank socket 354 can be further advanced into the power head 26a so that the first pin 360 becomes disposed, in part, within the cutouts 366.

The user can rotate the ratchet crank 354 by inserting a screwdriver or other suitable device through diametrically-opposed holes 372 formed in the ratchet crank 354, and applying a force to the screwdriver that causes the screwdriver to exert a torque on the ratchet crank 354 in the clockwise or counterclockwise direction. Alternatively, torque can be applied to the ratchet crank 354 using a ratchet. An end of the ratchet crank 354 has a substantially square hole 373 formed therein to accommodate the drive of the ratchet.

Rotating the ratchet crank socket 354 in the clockwise direction (from the perspective of FIG. 22) once the first pin 360 has entered the cutouts 366 of the ratchet crank socket 354 permits the platform assembly 20 to move toward its lower position. In particular, each of the cutouts 366 is defined, in part, by a surface portion 370a of the ratchet crank socket 354. The surface portions 370a are angled in relation to the longitudinal axis of the ratchet crank socket 354, so that rotation of the ratchet crank socket 354 in the clockwise direction causes the first pin 360 to ride up the surface portions 370a. In other words, the surface portions 370a, in conjunction with the torque exerted on the ratchet crank socket 354 by the user, cause the first pin 360 to translate linearly, away from the ratchet ring 350.

The movement the first pin 360 away from the ratchet ring 350 eventually causes the first pin 360 to exit the cutouts 362 formed in the ratchet ring 350. At this point, the first pin 360 no longer restrains the sprocket collar 352, and the sprocket collar 352 and the attached second sprocket 130 can rotate in the clockwise direction, in response to the combined weight of the platform assembly 20, the lifting column 22, and the scooter 12 (if the scooter 12 is positioned on the platform assembly 20).

Interference between the second pin 362 and an end of the ratchet crank socket 354 limits the extent to which the ratchet crank socket 354 can be inserted into the power head 26a, as noted above. This feature permits the first pin 360 can be pulled away from the ratchet ring 350 before the first pin 360 reaches the rearward end of the cutouts 366. In other words, limiting the extent to which the ratchet crank socket 354 can be inserted into the power head 26a permits the surface 370a to capture the first pin 360 proximate the entrance to each cutout 366, so that the first pin 360 can be drawn along the surfaces 370a a sufficient distance to cause the first pin 360 to back out of the cutouts 362.

Rotation of the ratchet ring 350 in the clockwise direction subsequently brings the neighboring pair of diametrically-opposed cutouts 362 into alignment with the first pin 360. The bias of the spring 365 urges the first pin 360 into the cutouts 362. The resulting contact between the surface portions 363a associated with the cutouts 363 and the second pin 360 stops the rotation of the sprocket collar 352 and the second sprocket 130, and thereby interrupts the downward movement of the platform assembly 20. The ratchet crank socket 354 can be further rotated by the user at this point, to drive the first pin 360 from the cutouts 362 and effectuate further lowering of the platform 20. Lowering the platform assembly 20 in the manner substantially reduces the potential to the platform assembly 20 to lower in an uncontrolled, unrestrained manner. In other words, the manual cranking mechanism 348 is configured so that the platform assembly 20 must be ratcheted gradually toward its lower position.

Rotating the ratchet crank socket 354 in the counterclockwise direction (from the perspective of FIG. 22) when the first pin 360 is positioned within the cutouts 366 raises the platform assembly 20. In particular, the cutouts 366 in the ratchet crank socket 354 are further defined by a second surface portion 370b. The second surface portions are substantially parallel to the longitudinal axis of the ratchet crank socket 354. The second surface portions 370b contact the ends 360a of the first pin 360 when the ratchet crank socket 354 is rotated in the counterclockwise direction. The torque exerted on the ratchet crank socket 354 is thus transferred to the sprocket collar 352 by way of the first pin 360.

The second surface portions 363b of the ratchet ring 350 each have a curvilinear shape that causes the first pin 360 to ride up the second surface portions 363b, against the bias of the spring 365, when the first pin 360 is subjected to a torque in the counterclockwise direction. In other words, the second surface portions 363b to not substantially resist movement of the first pin 360 in the counterclockwise direction. The first pin 360, the socket collar 352, and the second spool 130 therefore can be ratcheted in the counterclockwise direction, between adjacent cutouts 362. Rotation of the second spool 130 in the counterclockwise direction, in turn, raises the platform assembly 20.

FIGS. 25-27B depict a strap mechanism 380 that can be used in lieu of the hold-down arm assembly 230 to secure the scooter 12 on the platform assembly 20. The strap mechanism 380 comprises a spool 382, and a strap 384 mounted on the spool 382. The spool 382 can be rotatably mounted on a pivot 392 secured to the gusset 82 of the tongue weldment 80.

Figure 25:
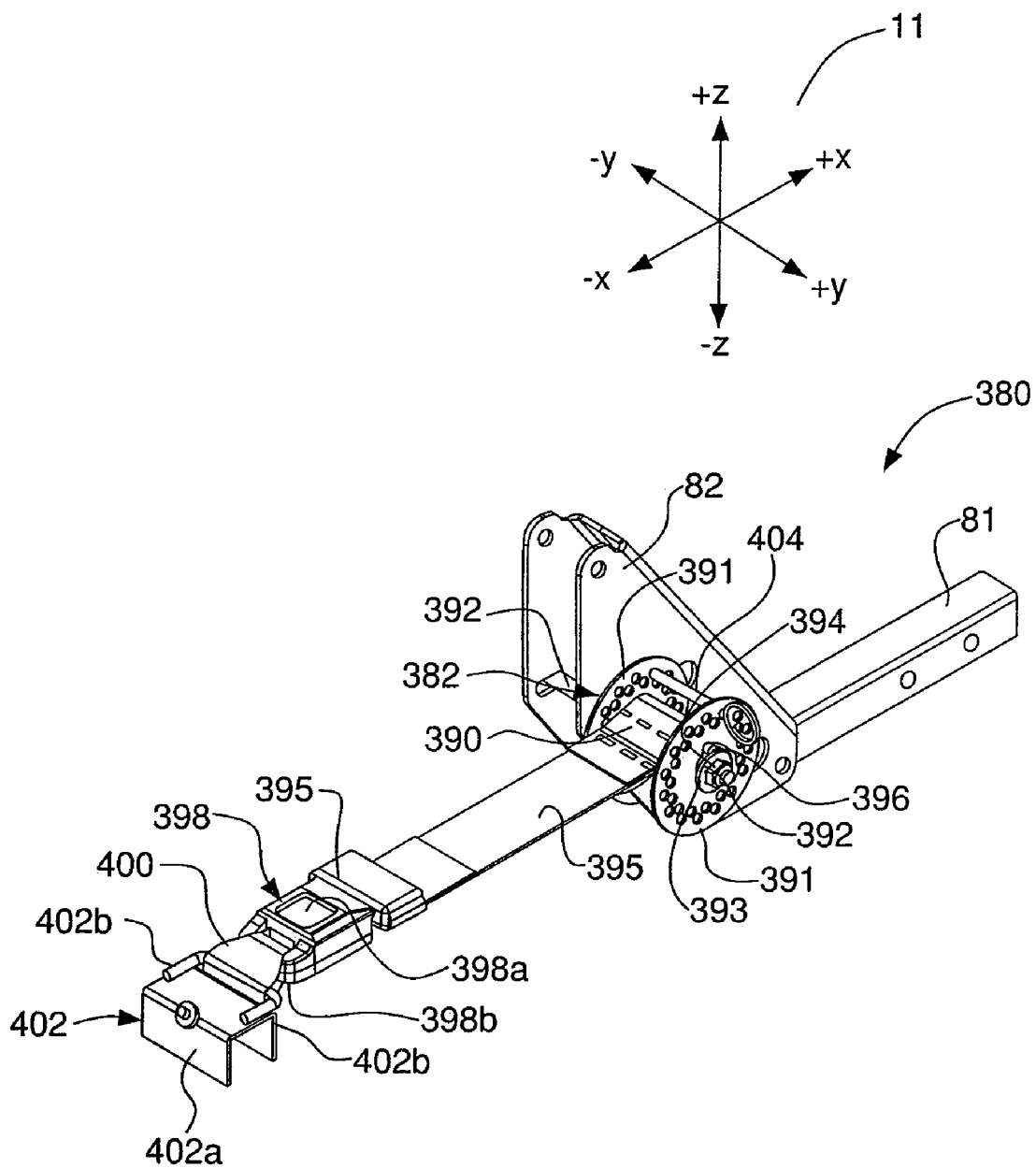
FIG. 25 is a perspective view of a strap mechanism for use with the lift and carrier assembly shown in FIGS. 1-17 and 18B.
Figure 26:
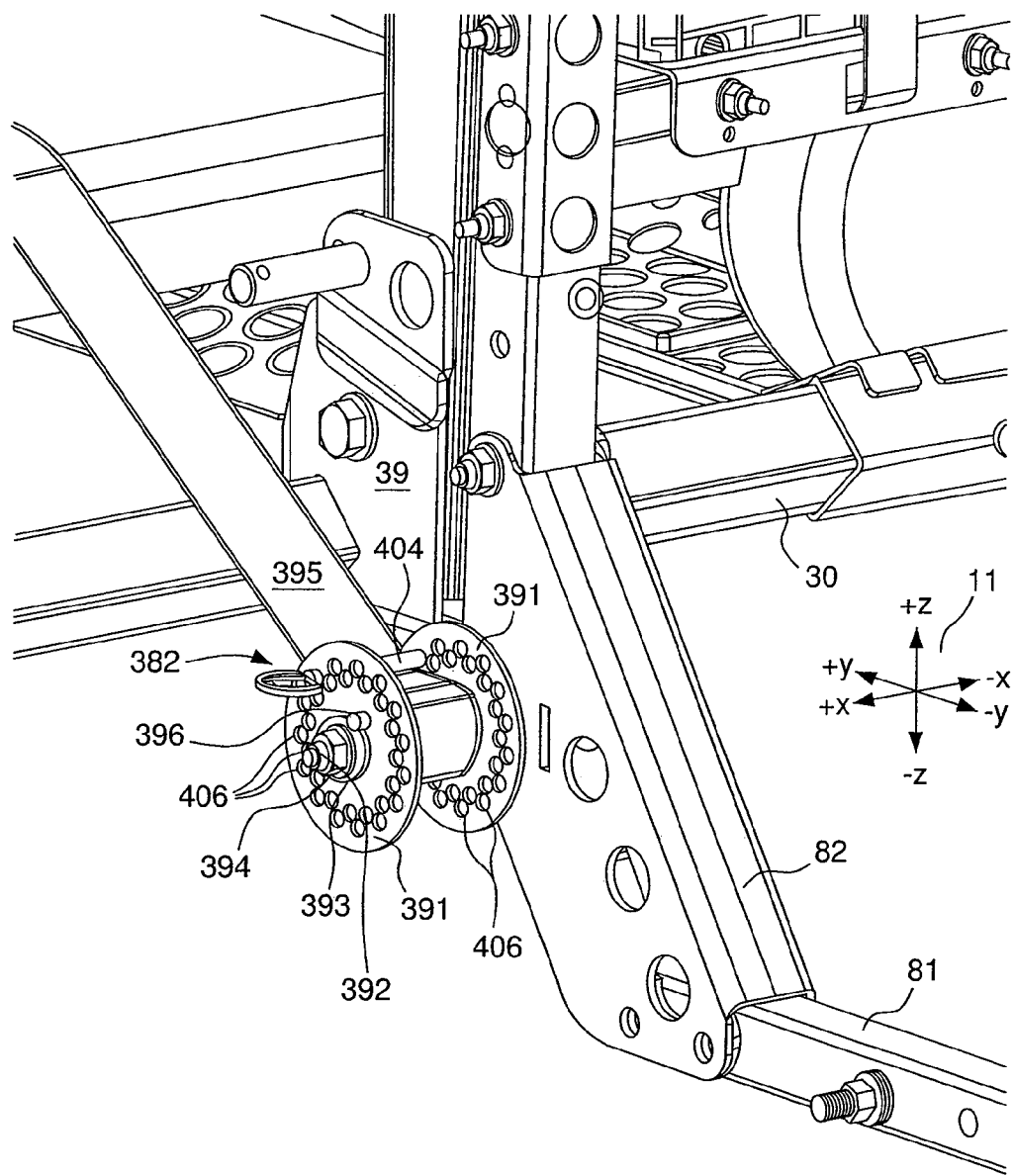
FIG. 26 is a perspective view of the strap mechanism shown in FIG. 25, installed on the lift and carrier assembly shown in FIGS. 1-17 and 18B, with the platform of the lift and carrier assembly in its upper, unfolded position.

The spool 382 comprises a cylindrical hub 390 positioned over the pivot 246, and a first and a second guide disk 391 positioned at opposing ends of the hub 390 (see FIGS. 25 and 26). The innermost of the guide disks 391 is separated from the gusset 82 of the tongue weldment 80 by a spacer (not shown). The hub 390 and the first and second guide disks 391 are held on the pivot 392 by a washer 393, and a nut 394 secured to an end of the pivot 392, as shown in FIGS. 25 and 26 (another of the washers 393 is disposed between the innermost of the guide disks 391 and the spacer).

The strap mechanism 380 also includes a tongue 395 secured to a first end of the strap 384. A second end of the strap 384 has a fold formed therein. The strap 384 is retained on the spool 382 by a first pin 396 inserted in the fold. A hole is formed in each of the first and second guide disks 391, proximate the inner diameter thereof, for accommodating the first pin 396. The first pin 396 is retained between the first and second guide disks 391 by the washers 393, as shown in FIGS. 25 and 26.

The strap mechanism 380 also includes a buckle 398, a loop 400, and a bracket 402. The buckle 398 is configured to securely mate with the tongue 395. The user can disengage the tongue 395 and the buckle 398 by depressing a button 398a on the buckle, and pulling the tongue 395 and the buckle 398 apart. The loop 400 is retained on the buckle 398 by an arm 398b of the buckle 398.

The bracket 402 has a mounting portion 402a configured to fit over the second cross member 32. The mounting portion 402a can be secured to the second cross member 32 by a suitable means such as a set screw. The bracket 402 preferably has two hooks 402b that adjoin the mounting portion 402a. The loop 400 can be inserted through a gap formed between the hooks 402b. The hooks 402b retain the loop 400 on the bracket 402.

The strap 384 secures the scooter 12 on the platform assembly 20. The strap 384 can be placed across the floorboard of the scooter 12 after the scooter 12 has been driven onto the platform assembly 20. The tongue 395 can subsequently be inserted into the buckle 398 to secure the strap to the second cross member 32, by way of the mounting bracket 402.

Figure 27A:
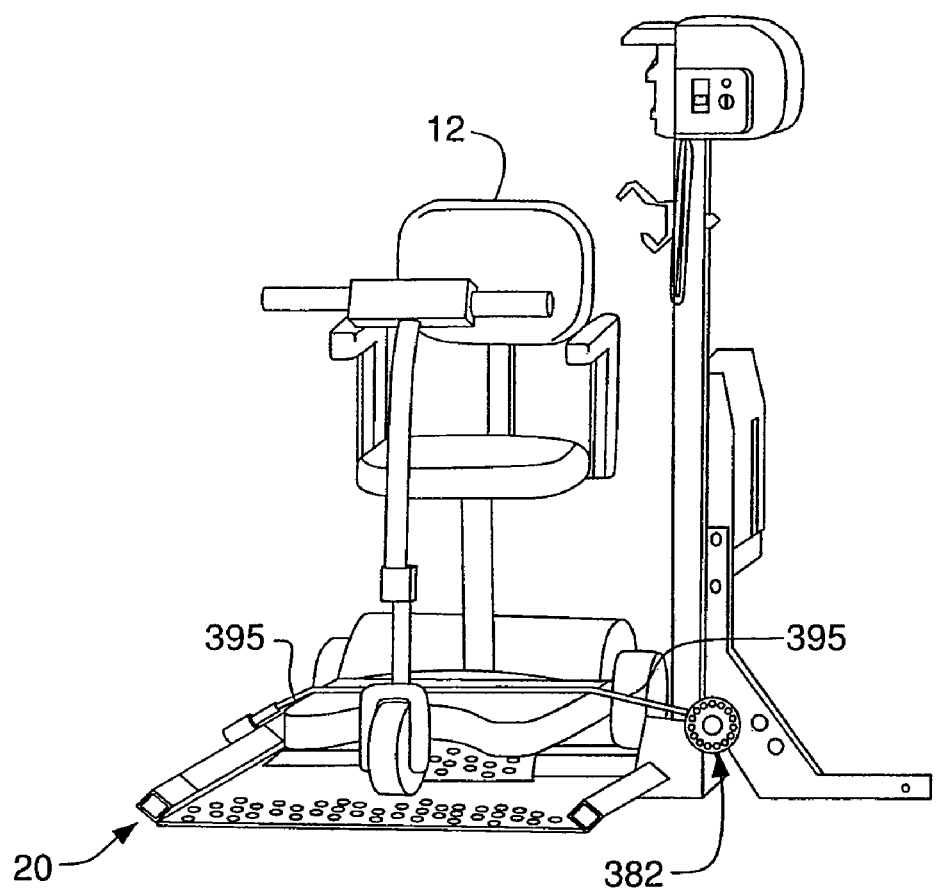
FIG. 27A is a front view of the strap mechanism shown in FIGS. 25 and 26, installed on the lift and carrier assembly shown in FIGS. 1-17, 18B, and 26, with the platform of the lift and carrier positioned to provide a minimum path between a spool and a buckle of the strap mechanism.

The user preferably raises the platform assembly 20 to a pre-determined height before securing the strap 384 to the second cross member 32, as shown in FIG. 27A. More particularly, the user preferably mates the tongue 395 and the buckle 398 when the platform assembly 20 positioned so that the path between the spool 382 and the buckle 398 is at its minimum. The path between the spool 382 and the buckle 398 is at its minimum when the platform assembly 20 is approximately three inches below its upper position, as depicted in FIG. 27A. It should be noted that the optimal position of the platform assembly 20 at which to secure the strap 384 is application dependent, and can vary with factors such as the height and geometry of the scooter 12. A specific position is disclosed herein for exemplary purposes only.

Slack in the strap 384 can be taken up once the buckle 398 and the tongue 395 are mated, by rolling the strap 384 onto the spool 382 until the strap 384 become taut.

The first and second guide disks 391 have holes 406 formed therein for receiving a second pin 404. Each hole 406 in the first guide disk 391 substantially aligns with a corresponding hole 406 in the second guide disk 391. A first plurality of the holes 406 are located at a first radial position in relation to the axis of rotation of the spool 382. A second plurality of the holes 406 are located radially outward of the first set.

The second pin 404 preferably is inserted into the pair of holes 406 located approximately at the nine o'clock position, from the perspective of FIG. 27A. Placing the second pin 404 at this location stretches the strap 384, and thereby places the strap 384 in tension.

The platform assembly 20 can subsequently be moved to its upper position (depicted in FIG. 27B). As the buckle 398 and the tongue 395 were mated when the path between the spool 382 and the buckle 398 was at or near its minimum, raising platform assembly 20 at this point lengthens the path, and thereby causes the strap 384 to stretch and tighten. The tightening of the strap 384 causes the strap 384 to exert a downward force on the floorboard of the scooter 12. (The strap 384 is thus self-tensioning.) The downward force helps to retain the scooter 12 on the platform assembly 20.

The second pin 404 prevents the strap 384 from unwinding in response to the additional tension introduced by raising the platform assembly 20, and thereby helps to maintain tension in the strap 382. In particular, the spool 382 rotates as the platform assembly 20 is raised, until the spool 382 reaches a point of equilibrium at which the net rotational force exerted on the spool 382 by the second pin 404 and the strap 384 is approximately zero. (The interaction of between the second pin 404 and the strap 384 is believed to exert a clockwise force on the spool 382, from the perspective of FIGS. 27A and 27B. The interaction between the strap 384, and the hub 390 on which the strap 384 is wound is believed to exert a clockwise force on the spool 382.)

Figure 27B:
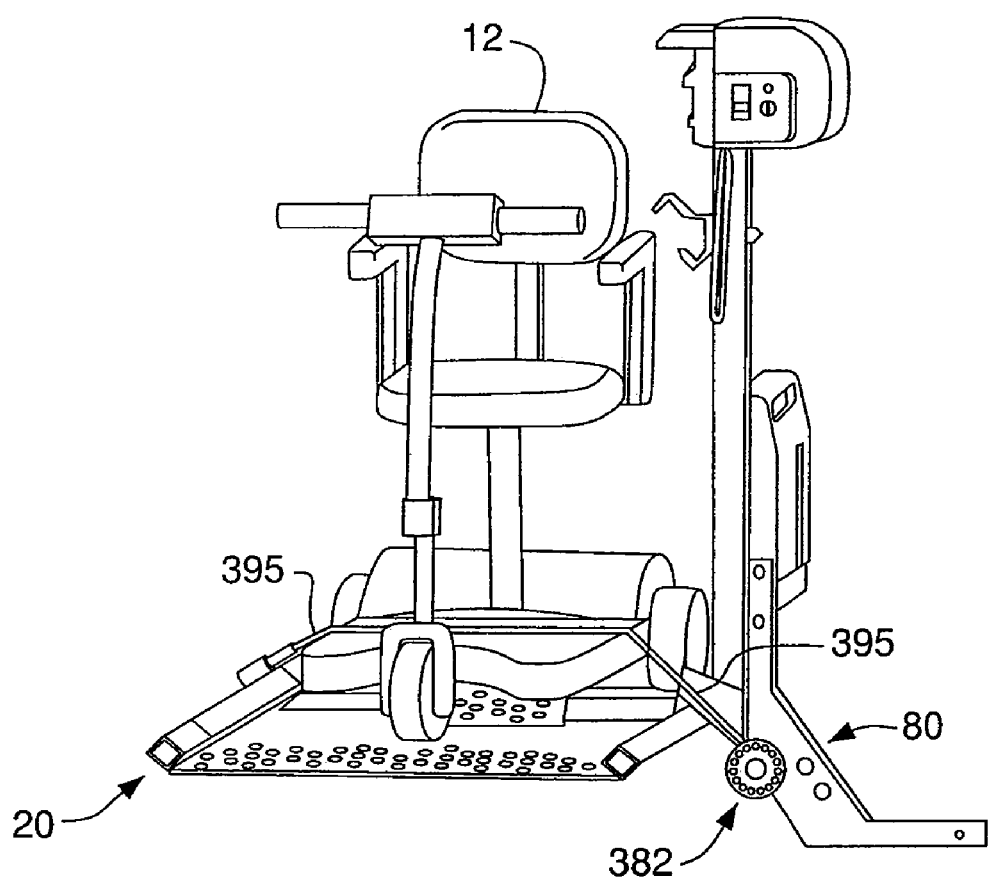
FIG. 27B is a front view of the strap mechanism shown in FIGS. 25-27A, installed on the lift and carrier assembly shown in FIGS. 1-17, 18B, 26, and 27A, with the platform of the lift and carrier assembly in its upper, unfolded position.

The restraint of the strap 384 by the second pin 404 and the hub 384 causes the strap 384 to bend as depicted in FIG. 27B. The strap 384 thus extends between the hub 390 and the second pin 404 at a first angle, and between the second pin 404 and the scooter 12 at a second angle. The orientation of the strap 384 in relation to the hub 390 causes the strap 384 to tighten around the hub 390, so that the strap 384 remains in tension and does not unwind from the spool 382.

The lift and carrier assembly 10 can be mounted on the transporting vehicle 15 using a trailer hitch 500, as noted above. The trailer hitch 500 can be formed from 2-inch square, 3/16-inch wall thickness C1010 alloy steel tubing, for a class II application. The tongue bar 81 can be formed from 1¼-inch square C1018 cold drawn steel, for the class II application.

The trailer hitch 500 has two opposing holes 502 formed therein (see FIG. 28). The tongue bar 81 has a through hole 506 formed therein. The through hole 506 substantially aligns with the holes 502 as the tongue bar 81 is inserted into the trailer hitch 500.

The tongue bar 81 can be secured to the trailer hitch 500 by a bolt 508, a spacer 510, a lock nut 512, and a stack of washers 514. In particular, the bolt 508 is inserted through the holes 502 and the through hole 506. The spacer 510 is positioned over the bolt 508 as shown in FIG. 28. Each hole 502 is sized so that the spacer 510 can fit within the hole 502, with minimal clearance between the circumference of the hole 502 and the outer circumference of the spacer 510 (the spacer is positioned within one, by not both of the holes 502 at any given time). The spacer 510 thus is positioned between a head 508a of the bolt 508, and the tongue bar 81.

The washers 514 are positioned between the trailer hitch 500 and the lock nut 512. The lock nut 512 and the bolt 508 have complementary threads that permit the lock nut 512 to be tightened against the washers 514. Tightening the lock nut 512 draws, or pulls the head 508a of the bolt 508 and the abutting spacer 510 toward the lock nut 512, and thereby urges the spacer 510 against the tongue bar 81. The force of spacer 510 against the tongue bar 81 substantially eliminates any play, i.e., free movement, between the tongue bar 81 and the trailer hitch 500 in the lateral (horizontal) direction.

Preferably, the thread on the bolt 508 do not extend to the area on the bolt 508 that contacts the trailer hitch 500 or the tongue bar 81. In other words, the threaded portion of the bolt 508 preferably is not subject to the shear stresses that arise due to the restraint of the tongue bar 81 by the trailer hitch 500 via the bolt 508.

The spacer 520 preferably is formed from ½-inch OD, 4140 alloy steel, 100K-psi tensile strength tubing. The bolt 508 preferably is a ½-inch×13 grade 5 hex bolt, for a class II application. For a class III application, the bolt 508 can be a ⅜-inch×13, to a ½-inch×16 grade 5 hex bolt.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

PARTS LIST

Lift and carrier assembly 10
Scooter 12
Wheelchair 14
Platform assembly 20
Lifting column 22
Upper end 22a (of lifting column 22)
First side 22b
Gusset 23 (of lifting column 22)

Actuator column 24
Power head 26
First cross member 30
Second cross member 32
First platform weldment 33
Second platform weldment 34
Gusset 39 (of platform assembly 20)
Platform 40 (of first platform weldment 32)
Transverse support 42
Outer supports 44
Gussets 46
Lip 48 (of platform 40)
Tabs 49
Tongue 50
Guides 51
Weld nuts 52 (in outer supports 44)
Set screws 54
Platform 60 (of second platform weldment 34)
Transverse support 62
Outer supports 64
Raised portions 65 (of platform 40)
Tongue weldment 80
Tongue bar 81
Gusset 82
Vertical tongue 83
Hole 85 (in gusset 82)
Slots 86
Bolts 87
Nuts 88
Weld nut 89
Flat head bolt 90
Front bracket 104
Motor mount 106
Motor 108
Shaft 117 (of motor 108)
Cover 109
License plate holder 110
Light 111 (for license plate holder 110)
Hinges 112
Battery 113
Bracket 114 (for battery 113)
Strap 116
Output shaft 117 (of motor 108)
Rocker switch 120
Key switch 122
First indicator light 124
Panel 125
Spool 126
Second indicator light 127
First sprocket 128
Second sprocket 130
Chain 131
Strap 132
First pin 136 (in lifting column 22)
Pin 138 (for spool 126)
Hole 140 (in first bracket 104)
First limit switch 150
Roller 150a (of first limit switch 150)
Switch block 153 (of first limit switch 150)
Guide screws 154
Slots 155 (in first bracket 104)
Bolt 156
Hole 157 (in first bracket 104)
Latch 158
Latch handle 160
Second limit switch 164
Roller 164a (on second limit switch 164)
Third limit switch 162
Roller 162a (on third limit switch 162)
Link 170
Second pin 172 (in lifting column 22)
Cutout 174 (in lifting column 22)
Gas cylinder 200
Body 202
Rod 204
Gusset 205
Eyelets 206, 208
Cutout 209 (in lifting column 22)
Bracket 218
Weld nuts 220
Set screw 222
Holes 224 (in first cross member 30)
Hold-down assembly 230
Hold-down arm 232
Holes 233 (in hold-down arm 232)
Glides 234
Hold-down arm plate 235
Shaft 238 (of glide 234)
Cup 240
Nuts 242
Guide ears 245
Pivot 246
Spring 248
Cam follower 250
Cam follower plate 252
Mounting portion 252a (of cam follower plate 252)
Cam follower shaft 254
Surface portions 260, 262 (of cam follower plate 252)
Hook-shaped portion 264 (of cam follower plate 252)
Stop 266
Swing-away adapter 300
Swing-away adapter 300a
Swing-away adapter 300b
First arm 302 (of swing-away adapter 300)
Second arm 303
Bracket 305
Pin 306
Gusset 307
Tongue bar 308
Locking arm 309
First bracket 310
Second bracket 311
Ramp portions 312
Ramp portion 313
Ramp portion 316
Platform assembly 330
Cross member 332
Platform weldment 333
Rail member 334
Platform 336
First transverse support 337
Second transverse support 338
Front portion 334a (of rail member 334)
Side portion 334b
Rear portion 334c
Gusset 335
Hold-down arm assembly 340
Hold-down arm 341
Pads 342
Bracket 343
Cross brace 344
Brace 345
Manual cranking mechanism 348
Ratchet ring 350

Sprocket collar 352
Ratchet crank socket 354
First pin 360
Ends 360a (of first pin 360)
Slots 361 (in sprocket collar 352)
Cutouts 362 (in ratchet ring 350)
Spring 365
First and second surface portions 363a (of ratchet ring 350)
Second pin 362
Surface portions 363a, 363b (of ratchet ring 350)
Cutouts 366 (in ratchet crank socket 354)
First and second surface portions 370a, 370b (of ratchet crank socket 354)
Holes 372 (in ratchet crank 354)
Hole 373 (in ratchet crank 354)
Strap mechanism 380
Spool 382 (of strap mechanism 380)
Strap 384
Hub 390
First and second guide disks 391
Pivot 392
Washers 393
Nuts 394
Tongue 395
First pin 396
Buckle 398
Loop 400
Bracket 402
Mounting portion 402a (of bracket 402)
Hooks 402b
Second pin 404
Holes 406 (in first and second guide disks 391)
Trailer hitch 500
Holes 502 (in trailer hitch 500)
Through hole 506 (in tongue bar 81)
tongue bar 81 is inserted into the trailer hitch 500.
Bolt 508
Spacer 510
Lock nut 512
Washers 514

What is claimed is:

1. A lift and carrier assembly for a personal-transportation vehicle, comprising:
a first column;
a second column telescopically disposed within the first column;
a platform assembly pivotally coupled to the second column for supporting the personal-transportation vehicle, the platform assembly and the second column translating linearly in relation to the first column between a first and a second position, the platform assembly comprising: (i) a first and a second cross member; (ii) a first platform weldment comprising a first platform for supporting a front wheel of the personal-transportation vehicle, and a first and a second support fixed to the first platform for securely engaging the respective first and second cross members; and (iii) a second platform weldment comprising a second platform for supporting a rear wheel of the personal-transportation vehicle, and a first and a second support fixed to the second platform for securely engaging the respective first and second cross members, wherein the first and second supports of the first and second platform weldments are selectively positionable along the respective first and second cross members so that the relative positions of the first and second weldments can be adjusted;
a motor mounted on the first column and coupled to the second column for lifting and lowering the second column and the platform assembly between the first and second positions;
a latch movable between a first position, and a second position wherein the latch engages a pin mounted on the second column when the second column and the platform assembly are in the second position thereby securing the second column and the platform assembly in the second position;
a first limit switch, wherein the second column and the platform assembly translate linearly in relation to the first column between a first and a second position, the second column contacts the first limit switch thereby causing the first limit switch to generate a first output signal when the second column and the platform assembly reach the second position, and the first output signal causes the motor to deactivate;
a second limit switch for generating a second output signal when the latch handle is in its second position;
a light that illuminates in response to the first and second output signal; and
a third limit switch for generating a third output signal when the latch handle is in its first position, wherein the motor is responsive to the third output signal so that the second column and the platform assembly can be moved from their second to their first position only when the latch handle is in its first position.

2. The lift and carrier assembly of claim 1, wherein the platform assembly is interchangeable between a first platform assembly for supporting an ultra-lite scooter, and a second platform assembly for supporting a wheelchair.

3. The lift and carrier assembly of claim 1, further comprising a bracket mounted on the first column, wherein a switch block of the first limit switch is attached to the bracket by a screw, the screw extends through a slot formed in the bracket so that the switch block can translate in relation to the bracket, and the bracket has a hole formed therein for restraining a head of a bolt that engages the switch block so that a position of the first limit switch in relation to the bracket can be adjusted by turning the head of the bolt.

4. The lift and carrier assembly of claim 1, further comprising a hold-down arm assembly, the hold-down arm assembly comprising: an arm coupled the first column so that the arm can pivot in relation to the first column between a first and a second position; a first plate fixedly coupled to the platform assembly; a cam follower rotatably mounted on the first plate; and a second plate fixedly coupled to the arm; wherein the platform assembly can pivot in relation to the second column between a first and as second position, and the cam follower contacts the second plate and urges the arm from its first to its second position when the platform assembly moves from its first to its second position.

5. The lift and carrier assembly of claim 4, further comprising a plurality of glides mounted on the arm for exerting a downward force on the personal-transportation vehicle when the arm is in its second position and the personal-transportation vehicle is positioned on the platform assembly, wherein the arm has a plurality of holes formed along a length thereof for mounting the glides so that the glides can be selectively positioned along the length of the arm; wherein each of the glides comprises a shaft positioned in a respective one of the holes, a cup mounted on an end of the shaft for contacting the personal-transportation vehicle, and nuts threaded to the shaft for securing the shaft to the arm so that a distance between the cup and the arm can be varied.

6. The lift and carrier assembly of claim 1, further comprising a strap coupled to the motor and the second column for lifting and lowering the second column and the platform assembly between the first and second positions; a first sprocket coupled to the motor so that the motor rotates the first sprocket; a second sprocket; a chain for coupling the first and the second sprocket so that the second sprocket rotates in response to rotation of the first sprocket; a spool mounted on the second sprocket and having the strap wound thereon.

7. The lift and carrier assembly of claim 1, further comprising a strap assembly comprising a spool rotatably coupled to the first column, a strap wound on the spool, a tongue fixedly coupled to the strap, a buckle fixedly coupled to the platform assembly for securely engaging the tongue on a selective basis so that the strap can be placed across a floorboard of the personal-transportation vehicle, and a pin for engaging the spool and tensioning the strap.

8. The lift and carrier assembly of claim 7, wherein the spool comprises a hub, and a first and a second disk fixedly coupled to opposing sides of the hub, the first and second disks each having a plurality of holes formed therein for receiving the pin so that the tension in the strap can be adjusted.

9. The lift and carrier assembly of claim 1, wherein:
the first and second supports of the first weldment are fixed to opposing ends of the platform of the first weldment, and the first and second supports of the first weldment are telescopically disposed over the respective first and second cross members; and
the first and second supports of the second weldment are fixed to opposing ends of the platform of the second weldment, and the first and second supports of the second weldment are telescopically disposed over the respective first and second cross members.

10. The lift and carrier assembly of claim 1, wherein:
the first weldment further comprises a first and a second set screw, and a first and a second weld nut mounted on the respective first and second supports of the first weldment for receiving the respective first and second set screws so that the first and second set screws engage the respective first and second cross members thereby securing the first weldment to the first and second cross members; and
the second weldment further comprises a first and a second set screw, and a first and a second weld nut mounted on the respective first and second supports of the second weldment for receiving the respective first and second set screws of the second weldment so that the first and second set screws of the second weldment enage the respective first and second cross members thereby securing the second weldment to the first and second cross members.

11. A lift and carrier assembly for a personal-transportation vehicle, comprising:
a first column;
a second column telescopically disposed within the first column;
a platform assembly pivotally coupled to the second column for supporting the personal-transportation vehicle, the platform assembly and the second column translating linearly in relation to the first column between a first and a second position, the platform assembly comprising: (i) a first and a second cross member; (ii) a first platform weldment comprising a first platform for supporting a front wheel of the personal-transportation vehicle, and a first and a second support fixed to the first platform for securely engaging the respective first and second cross members; and (iii) a second platform weldment comprising a second platform for supporting a rear wheel of the personal-transportation vehicle, and a first and a second support fixed to the second platform for securely engaging the respective first and second cross members, wherein the first and second supports of the first and second platform weldments are selectively positionable along the respective first and second cross members so that the relative positions of the first and second weldments can be adjusted;
a motor mounted on the first column and coupled to the second column for lifting and lowering the second column and the platform assembly between the first and second positions;
a latch movable between a first position, and a second position wherein the latch engages a pin mounted on the second column when the second column and the platform assembly are in the second position thereby securing the second column and the platform assembly in the second position;
a hold-down arm assembly comprising: an arm coupled to the first column so that the arm can pivot in relation to the first column between a first and a second position; a first plate fixedly coupled to the platform assembly; a cam follower rotatably mounted on the first plate; and a second plate fixedly coupled to the arm; wherein the platform assembly can pivot in relation to the second column between a first and a second position, and the cam follower contacts the second plate and urges the arm from its first to its second position when the platform assembly moves from its first to its second position; and
a plurality of glides mounted on the arm for exerting a downward force on the personal-transportation vehicle when the arm is in its second position and the personal-transportation vehicle is positioned on the platform assembly, wherein: the arm has a plurality of holes formed along a length thereof for mounting the glides so that the glides can be selectively positioned along the length of the arm; and each of the glides comprises a shaft positioned in a respective one of the holes, a cup mounted on an end of the shaft for contacting the personal-transportation vehicle, and nuts threaded to the shaft for securing the shaft to the arm so that a distance between the cup and the arm can be varied.

12. A lift and carrier assembly for a personal-transportation vehicle, comprising:
a first column;
a second column telescopically disposed within the first column;
a platform assembly pivotally coupled to the second column for supporting the personal-transportation vehicle, the platform assembly and the second column translating linearly in relation to the first column between a first and a second position, the platform assembly comprising a cross member pivotally coupled to the lifting column, a platform weldment mounted on the cross member for supporting the front wheels of a wheelchair, and a rail member fixedly coupled to the cross member and the platform weldment for cradling the rear wheels of the wheelchair;
a motor mounted on the first column and coupled to the second column for lifting and lowering the second column and the platform assembly between the first and second positions;
a latch movable between a first position, and a second position wherein the latch engages a pin mounted on the second column when the second column and the platform assembly are in the second position thereby securing the second column and the platform assembly in the second position;

a first limit switch, wherein the second column and the platform assembly translate linearly in relation to the first column between a first and a second position, the second column contacts the first limit switch thereby causing the first limit switch to generate a first output signal when the second column and the platform assembly reach the second position, and the first output signal causes the motor to deactivate;

a second limit switch for generating a second output signal when the latch handle is in its second position;

a light that illuminates in response to the first and second output signal; and a third limit switch for generating a third output signal when the latch handle is in its first position, wherein the motor is responsive to the third output signal so that the second column and the platform assembly can be moved from their second to their first position only when the latch handle is in its first position.

* * * * *